United States Patent
Bone et al.

(10) Patent No.: US 9,104,009 B2
(45) Date of Patent: Aug. 11, 2015

(54) OPTICAL IMAGING SYSTEM AND ELECTRONIC APPARATUS INCLUDING THE SAME

(71) Applicant: Genius Electronic Optical Co., Ltd., Taichung (TW)

(72) Inventors: Matthew Bone, Fremont, CA (US); Poche Lee, Taichung (TW); Chih-Yang Yeh, Taichung (TW); Tzu Chien Tang, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 68 days.

(21) Appl. No.: 14/137,949

(22) Filed: Dec. 20, 2013

(65) Prior Publication Data

US 2015/0177482 A1 Jun. 25, 2015

(51) Int. Cl.
| | |
|---|---|
| *H04N 5/262* | (2006.01) |
| *H04N 5/238* | (2006.01) |
| *G02B 21/02* | (2006.01) |
| *G02B 9/62* | (2006.01) |
| *G03B 17/56* | (2006.01) |
| *G03B 13/32* | (2006.01) |
| *G02B 13/00* | (2006.01) |
| *H04N 5/225* | (2006.01) |

(52) U.S. Cl.
CPC .............. *G02B 9/62* (2013.01); *G02B 13/0015* (2013.01); *G03B 13/32* (2013.01); *G03B 17/565* (2013.01); *H04N 5/2254* (2013.01)

(58) Field of Classification Search
CPC ...... G02B 13/0045; G02B 9/62; G02B 13/06; G02B 13/18; G02B 3/04; G02B 13/04; G02B 9/60; H04N 5/2254
USPC ...................... 348/240.1–240.3, 240.99, 365; 359/658, 713, 727
See application file for complete search history.

(56) References Cited

U.S. PATENT DOCUMENTS

| | | | |
|---|---|---|---|
| 3,958,864 A | 5/1976 | Glatzel | |
| 2005/0057816 A1* | 3/2005 | Sato | 359/676 |
| 2005/0200969 A1* | 9/2005 | Nose et al. | 359/680 |
| 2006/0245078 A1* | 11/2006 | Kawamura | 359/689 |
| 2007/0171544 A1* | 7/2007 | Noda | 359/689 |
| 2014/0063323 A1* | 3/2014 | Yamazaki et al. | 348/335 |
| 2015/0002728 A1* | 1/2015 | Tsai et al. | 348/360 |
| 2015/0054994 A1* | 2/2015 | Tsai et al. | 348/294 |

* cited by examiner

*Primary Examiner* — Trung Diep
(74) *Attorney, Agent, or Firm* — Kilpatrick Townsend and Stockton LLP

(57) ABSTRACT

An imaging optical system includes, in order from the object side to the image side, a first lens element, a second lens element, a third lens element, an aperture stop, a fourth lens element, a fifth lens element, and a sixth lens element arranged along an optical axis. The first lens element has a concave image-side surface in the vicinity of the optical axis. The second lens element has a negative refractive power. The third lens element has a convex object-side surface in a vicinity of an optical axis. The fourth lens element has a convex object-side surface in the vicinity of the optical axis. The fifth lens element has a convex image-side surface in the vicinity of the optical axis. The sixth lens element is made of plastic and has a convex image-side surface in a vicinity of an outer circumference.

20 Claims, 11 Drawing Sheets

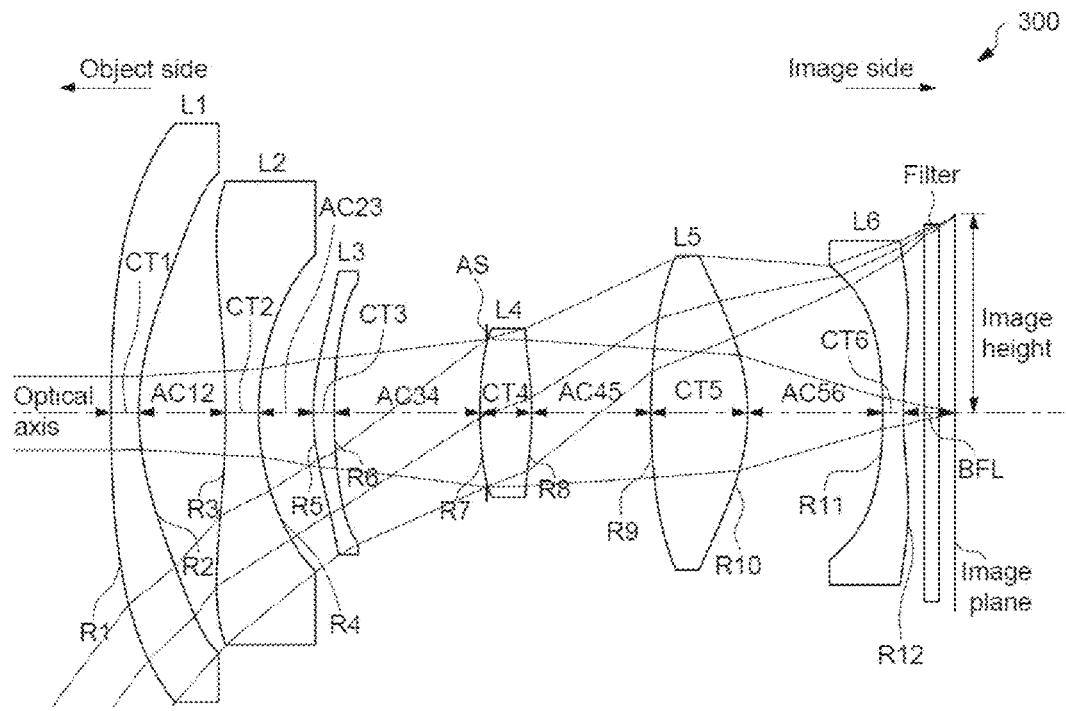
FIG. 4A
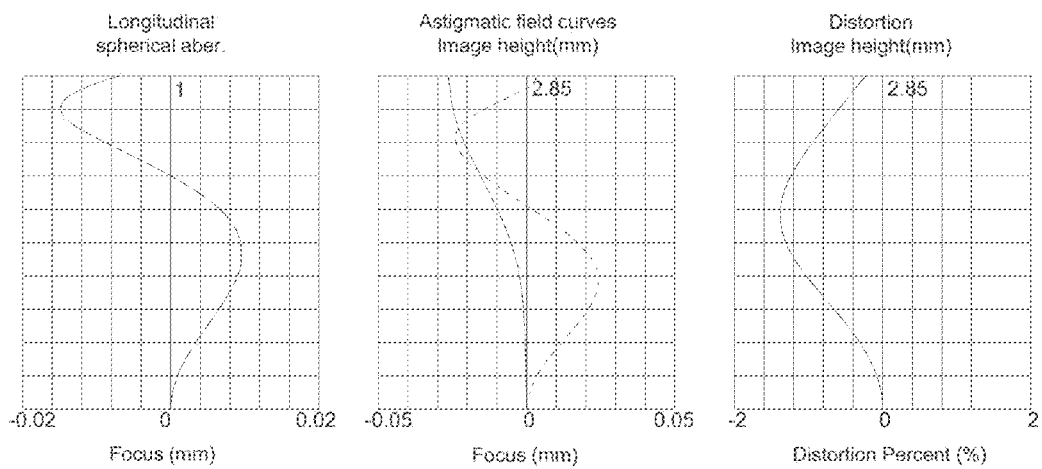
FIG. 4B
FIG. 4C
FIG. 4D

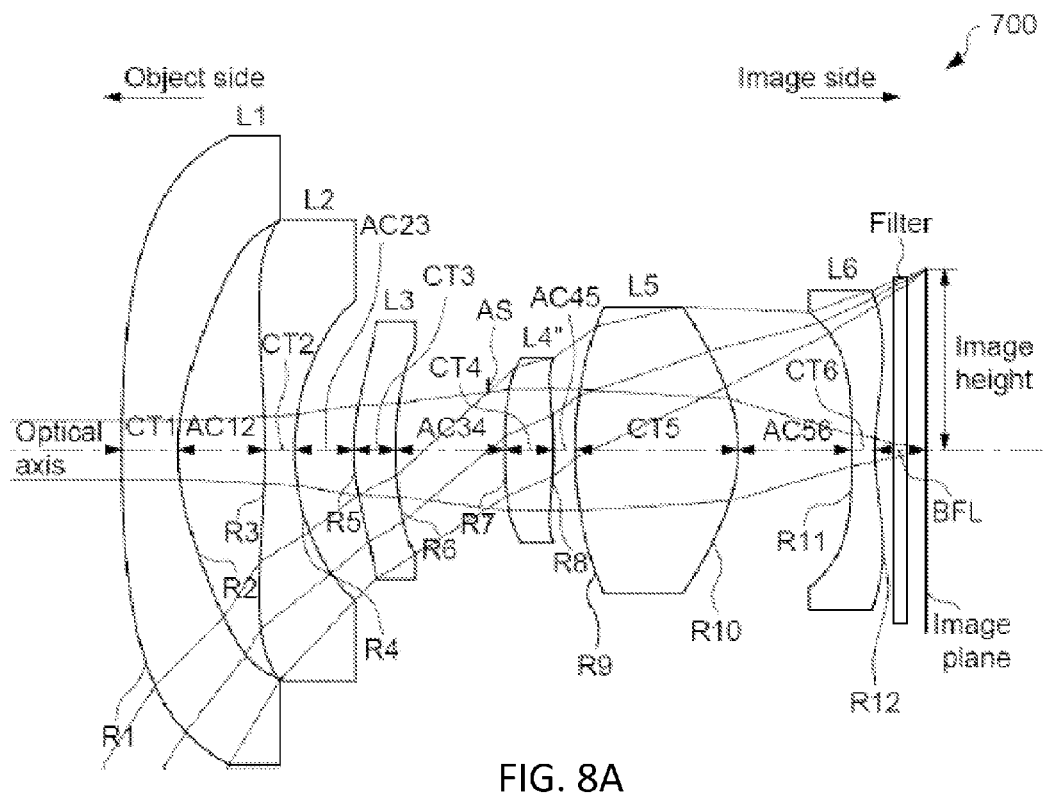
FIG. 8A
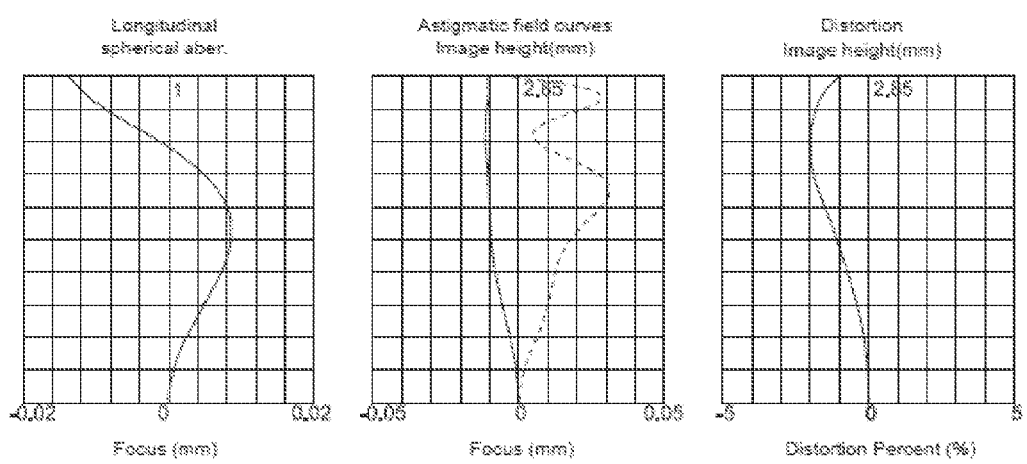
FIG. 8B
FIG. 8C
FIG. 8D

OPTICAL IMAGING SYSTEM AND ELECTRONIC APPARATUS INCLUDING THE SAME

BACKGROUND OF THE INVENTION

The present disclosure relates to an electrical device and an optical imaging lens thereof, and more particularly to an infrared optical imaging lens system having six lens elements and a mobile device incorporating the same.

Mobile electronic devices with built-in digital cameras are becoming increasingly popular. Along with trends of downsizing in digital cameras and cell phones and recent technological advances in charge coupled devices (CCD) and CMOS imaging sensors, optical lens systems also need to reduce their size. However, the size reduction of the optical imaging lens systems also has to take into account optical performance requirements.

Wavelengths longer than 700 nm are not directly perceived by human eyes. These wavelengths have the characteristics of anti jamming capability, low cost, low power consumption, and undetectability to a human eye. They are often used in remote control devices, infrared detection systems, and the like. In recent years, interactive electronic devices have been developed using infrared (IR) detectors to detect a user movement for achieving user interactions. For example, Taiwanese Patent Publication No. 201111828 discloses such an IR imaging lens group, whose half field of view (HFOV) angle is about 35 degrees, which is rather narrow.

The present invention relates to IR imaging lens systems having high quality, low cost and wide FOV angles.

SUMMARY

Certain embodiments of the present invention relate to an optical imaging system having six lens elements. In some embodiments, an optical imaging system includes, in order from the object side to the image side, a first lens element, a second lens element, a third lens element, an aperture stop, a fourth lens element, a fifth lens element, and a sixth lens element. The first lens element has a concave image-side surface in the vicinity of the optical axis. The second lens element has a negative refractive power. The third lens element has a convex object-side surface in a vicinity of the optical axis. The fourth lens element has a convex object-side surface in the vicinity of the optical axis. The fifth lens element has a convex image-side surface in the vicinity of the optical axis. The sixth lens element is made of plastic and has a convex image-side surface in a vicinity of the periphery. In some embodiments, the optical imaging system only has six lens elements each having a refractive power.

The sum of the thicknesses along the optical axis of the six lens elements can be defined as "ALT", the air gap along the optical axis between the fourth and fifth lens elements can be defined as "AC45". In some embodiments, these quantities satisfy the relation:

$ALT/AC45 \leq 45.0$.

Some embodiments of the present invention relate to a portable electronic device with a built-in digital camera. The portable electronic device includes a housing unit, a lens barrel mounted in the housing unit, and an optical lens module assembled in the lens barrel. The optical lens module may include, in order from the object side to the image side, a first lens element, a second lens element, a third lens element, an aperture stop, a fourth lens element, a fifth lens element, and a sixth lens element. The first lens element has a concave image-side surface in the vicinity of the optical axis. The second lens element has a negative refractive power. The third lens element has a convex object-side surface in a vicinity of an optical axis. The fourth lens element has a convex object-side surface in the vicinity of the optical axis. The fifth lens element has a convex image-side surface in the vicinity of the optical axis. The sixth lens element is made of plastic and has a convex image-side surface in a vicinity of an outer circumference.

The thickness along the optical axis of the third lens element can be defined as "CT3", and the air gap along the optical axis between the third and fourth lens elements can be defined as "AC34". In some embodiments, these quantities satisfy the relation:

$0.55 \leq AC34/CT3$.

The portable electronic device may further include an imaging sensor bonded on a substrate (chip-on-board). In some embodiments, the lens barrel is movable in the direction of the optical axis relative to the imaging sensor.

The following description, together with the accompanying drawings, will provide a better understanding of the nature and advantages of the claimed invention.

BRIEF DESCRIPTION OF THE DRAWINGS

FIG. 4A is a simplified cross-section view of a six-element optical lens system according to a third embodiment of the present invention.

FIGS. 4B, 4C, and 4D are graphs illustrating the respective longitudinal spherical aberration, astigmatic field curvatures, and distortion in the embodiment of FIG. 4A.

FIG. 8A is a simplified cross-section view of a six-element optical lens system according to a seventh embodiment of the present invention.

FIGS. 8B, 8C, and 8D are graphs illustrating the respective longitudinal spherical aberration, astigmatic field curvatures, and distortion in the embodiment of FIG. 8A.

DETAILED DESCRIPTION OF THE INVENTION

Certain embodiments of the present invention relate to six-element optical lens systems that have broad applications in electronic devices, such as a mobile phone, a digital still camera, a digital video camera, a tablet, and the like, that use a CCD or a CMOS imaging sensor. Lens data and other parameters of specific embodiments are described below. Those skilled in the art with access to the present disclosure will recognize that other lens systems can also be designed within the scope of the claimed invention.

DEFINITION OF TERMS

The expression "a lens element with a positive refractive power (or negative refractive power)" refers to the refractive power in the vicinity of the optical axis of the lens element having a positive refractive power (or negative refractive power). A lens element having a convex (or concave) surface in a region refers to that region having a convex portion (or concave portion) with respect to the adjacent outer region in the radial direction of that region, and the region has a protruding (convex) or depressed (concave) surface with respect to the optical axis.

Figure 1:
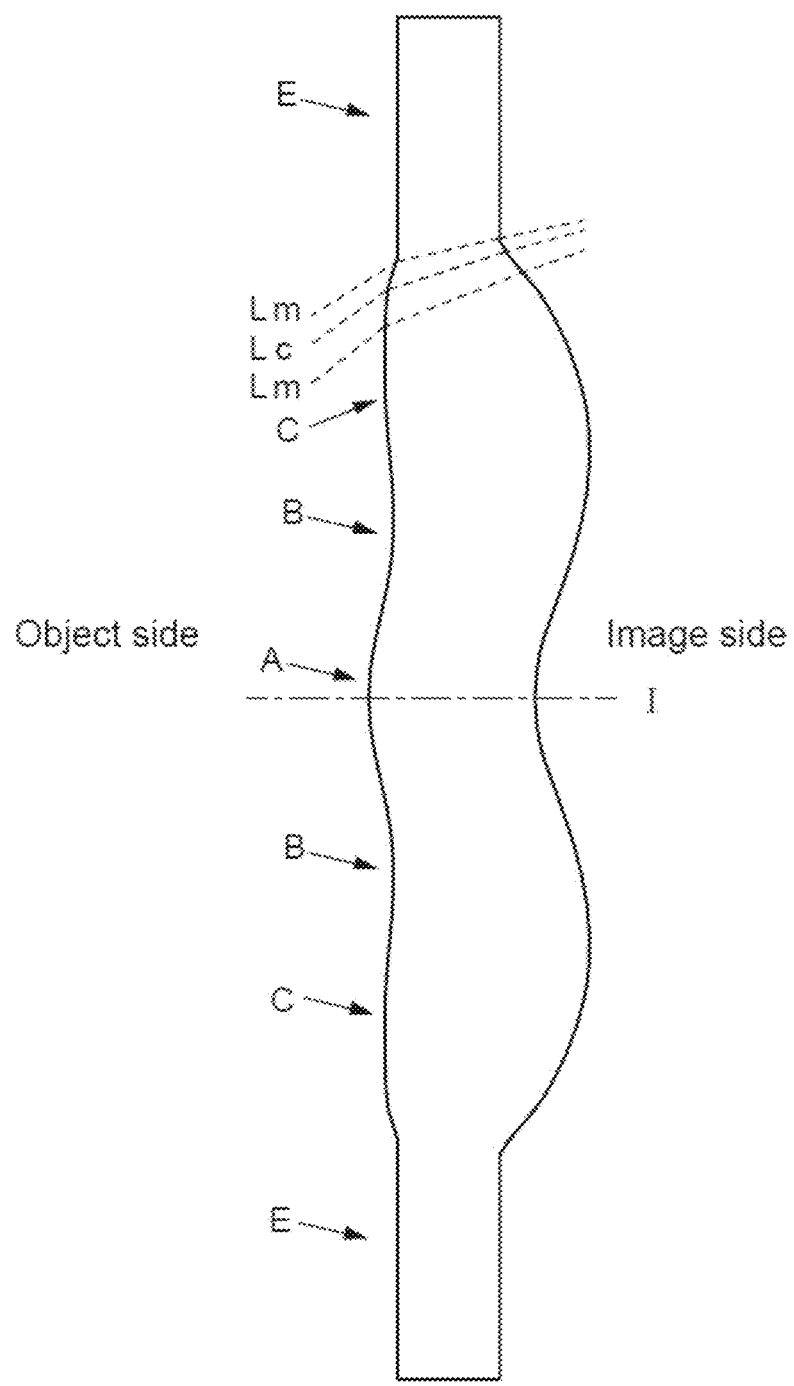
FIG. 1 is a cross section view of an exemplary lens element to explain the terms used in the present description.

FIG. 1 provides an example cross-sectional view of a lens element to explain the terms used in the present description. As shown in FIG. 1, "I" denotes the optical axis of an exemplary lens element 2 having rotational symmetry along the optical axis. The object side of the lens element has a convex surface in region A, a concave surface in region B, and a convex surface in regions C and D. Region A has a convex surface because the surface of the region A is protruding with respect to the adjacent radial outer region i.e., region B) and in the direction of the optical axis. Region B is depressed in relation to adjacent region A, C, or D. Region C or D is protruding with respect to adjacent region E, The expression "area around the circumference" refers to imaging light rays passing through the area in the vicinity of the circumferential edge of the lens element, i.e., the region C or D. The imaging light rays may include a chief ray Lc and marginal rays Lm. The expression "area in the vicinity of the optical axis" refers to imaging light passing through the region of the optical axis, i.e., the region A. The expression "area in a vicinity of an outer circumference of a lens element" means in the vicinity of the circumferential region on the surface of the lens element only where the imaging light passes, such as the region C or D. In addition, the lens element may include an extension portion or flange E configured to mount the lens element to a lens barrel. The desired imaging light rays may pass through the extended portion E. Although the extension portion E of the lens element may be part of the optical imaging system, a description and a sketch thereof will be omitted for the sake of brevity.

First Embodiment

FIG. 2 is a simplified cross-section view of a six-element optical lens system 100 according to a first embodiment of the present invention. Optical lens system 100 includes a first lens element L1, a second lens element L2, a third lens element L3, an optical aperture stop AS, a fourth lens element L4, a fifth lens element L5, and a sixth lens element L6 in order from the object side to the image side along the optical axis. Each lens element L1-L6 can be rotationally symmetric above the optical axis.

First lens element L1 has a negative refractive power, a convex object-side surface in the vicinity of the optical axis, a convex object-side surface in the outer circumferential region, a concave image-side surface in the vicinity of the optical axis and a concave image-side surface in the outer circumferential region. Second lens element L2 has a negative refractive power, a concave object-side surface in the vicinity of the optical axis and a convex object-side surface in the outer circumferential region, and a concave surface on the image side. The concave surface on the image side of the second lens element L2 having a concave image-side surface in the vicinity of the optical axis and a concave image-side surface in the outer circumferential region. Third lens element L3 has a positive refractive power, a convex object-side surface in the vicinity of the optical axis and a convex object-side surface in the outer circumferential region, and a concave surface on the image side along the optical axis. The concave surface on the image side of the third lens element L3 having a concave image-side surface in the vicinity of the optical axis and a concave image-side surface in the outer circumferential region. Fourth lens element L4 has a positive refractive power, a convex object-side surface in the vicinity of the optical axis and a convex object-side surface in the outer circumferential region, and a convex image-side surface which has a convex image-side surface in the vicinity of the optical axis and a convex image-side surface in the outer circumferential region. Fifth lens element L5 has a positive refractive power, a convex object-side surface in the vicinity of the optical axis, a convex object-side surface in the outer circumferential region, a convex image-side surface in the vicinity of the optical axis, and a convex image-side surface in the outer circumferential region. Sixth lens element L6 has a negative refractive power, a concave object-side surface in the vicinity of the optical axis, a concave object-side surface in the outer circumferential region, a concave image-side surface in the vicinity of the optical axis, and a convex image-side surface in the outer circumferential region.

Optical lens system 100 also includes a filter configured to block the passage of light at visible wavelengths. In some embodiments, the filter filters out wavelengths below about 700 nm. The optical filter blocks shorter wavelengths of the visible spectrum and passes through wavelengths above about 700 nm. The filter improves the infrared performance of the imaging lens system 100 by reducing interference from other light sources. Although the filter is shown as a single filter disposed between the sixth lens element and the image plane, the filter can be disposed in any other locations and can have one or more filter elements. R1 and R2 are the respective object side and image side surface of first lens element L1. Likewise, R3 and R4 are the respective object side and image side surface of second lens element L2. Similarly, R5 and R6 are the respective object-side and image-side surface of third lens element L3. R7 and R8 are the respective object-side and image-side surface of fourth lens element L4. R9 and R10 are the respective object-side and image-side surface of fifth lens element L5. R11 and R12 are the respective object-side and image-side surface of sixth lens element L6.

In FIGS. 2A to 10A, CT1 is the thickness of the first lens element L1, CT2 is the thickness of the second lens element L2, CT3 is the thickness of the third lens element L3, CT4 is the thickness of the fourth lens element L4, CT5 is the thickness of the fifth lens element L5, and CT6 is the thickness of the sixth lens element L6. Thicknesses CT1-CT6 are each measured along the optical axis. AC12 is the air gap between the first and second lens elements, AC23 is the air gap between the second and third lens elements, AC34 is the air gap between the third and fourth lens elements, AC45 is the air gap between the fourth and fifth lens elements, and AC56 is the air gap between the fifth and sixth lens elements. Air gaps AC12-AC56 are each measured along the optical axis. BFL denotes the back focal length, which is the distance between the image side of the sixth lens element and the image plane along the optical axis. BFL includes the thickness of the optical filter if the filter is disposed between the sixth lens element and the image plane. In the present disclosure, EFL denotes the effective focal length, which is also known as focal length. The focal length of an optical imaging system is defined as the distance over which collimated rays are brought to a focus. Hereinafter, the focal length is called effective focal length to distinguish from the back focal length (BFL).

In the following sections, ALT denotes the total thickness of the first to sixth lens elements, i.e., ALT=CT1+CT2+CT3+CT4+CT5+CT6. AAG denotes the total width of the air gaps of the first to sixth lens elements along the optical axis, i.e., AAG=AC12+AC23+AC34+AC45+AC56.

According to certain embodiments of the present invention, in order to reduce the total length of the optical lens system, the following measures can be taken: reducing the thickness of the lens elements and the air gaps between them. However, it is difficult to reduce the total thickness of the lens elements while maintaining adequate optical performance. Accordingly, the first lens element is designed to have a negative refractive power, the second lens element is designed to have a negative refractive power, the third lens element is designed to have a positive refractive power, the fourth lens element is designed to have a positive refractive power, the fifth lens element is designed to have a positive refractive power, and the sixth lens element is designed to have a negative refractive power. In order to increase the production yield and reduce manufacturing costs all six lens elements can be made of plastic. The aperture stop can be disposed between the third and fourth lens elements to obtain a large half field of view angle and improve the lens system performance.

According to the first embodiment, the first lens element has a concave surface on the image-side in the vicinity of the optical axis, the second lens element has a negative refractive power, the third lens element has a convex surface on the object in the vicinity of the optical axis, the fourth lens element has a convex surface on the object-side in the vicinity of the optical axis, the fifth lens element has a convex surface on the image-side in the vicinity of the optical axis, and the sixth lens element has a convex surface on the image-side near the outer circumference. The combination of these six lens elements provides the desired lens system quality. The combination of the second lens element having a concave surface in the vicinity of the optical axis and the fifth lens element having a positive refractive power and a convex surface in the vicinity of the optical axis provides an improved aberration correction. Making the six aspheric lens elements of plastic can lower the manufacturing costs and simplify the manufacturing process.

Table 1A shows numeric lens data of the lens elements of optical lens system 100 according to the first embodiment of the present invention.

TABLE 1A

|  | Curvature Radius (mm) | Thickness/ air gap (mm) | Refractive index | Abbe # | material | Focal length (mm) |
|---|---|---|---|---|---|---|
| Object | Infinity | 10000 |  |  |  |  |
| Lens 1 | 26.100 | 0.400 | 1.535 | 56.114 | plastic | −7.964 |
|  | 3.646 | 1.949 |  |  |  |  |
| Lens 2 | −12.039 | 0.630 | 1.535 | 56.114 | plastic | −5.049 |
|  | 3.549 | 0.674 |  |  |  |  |
| Lens 3 | 3.180 | 1.081 | 1.535 | 56.114 | plastic | 6.305 |
|  | 48.271 | 1.268 |  |  |  |  |
| Aperture stop | Infinity | −0.079 |  |  |  |  |
| Lens 4 | 6.353 | 0.593 | 1.535 | 56.114 | plastic | 4.789 |
|  | −4.159 | 1.194 |  |  |  |  |
| Lens 5 | 11.225 | 1.200 | 1.535 | 56.114 | plastic | 3.611 |
|  | −2.249 | 0.440 |  |  |  |  |
| Lens 6 | −12.388 | 1.470 | 1.535 | 56.114 | plastic | −4.817 |
|  | 3.392 | 0.302 |  |  |  |  |
| filter | Infinity | 0.210 |  |  |  |  |
|  | Infinity | 0.385 |  |  |  |  |
| Image plane | Infinity |  |  |  |  |  |

In the first embodiment, the effective focal length (EFL) is 1.956 mm, the half field of view (HFOV) is 55.142 degrees. The F number is 2.0. The image height is 2.85 mm. The BFL is 0.897 mm. The entire length of the optical system 100 measured from the object-side surface of the first lens element to the image plane is 11.717 mm.

The aspheric surface of the lens elements can be expressed using the following expression:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i$$

where Y is the perpendicular distance between the point of the aspherical surface and the optical axis, Z(Y) is the depth of the aspheric surface of the lens element (the height of a point on the aspheric surface at a distance Y from the optical axis relative to the tangential plane at the aspheric surface vertex), R is the radius of curvature in millimeters (mm) from the optical axis to the lens surface, K is a conic constant, and a(i) is an aspheric surface coefficient of i-th level (or order term).

Table 1B shows numeric lens data of the conic constant K and aspheric surface coefficients as for each of the lens surfaces of optical lens system 100 according to the first embodiment of the present invention.

TABLE 1B

| Surface # | R1 | R2 | R3 | R4 | R5 | R6 |
|---|---|---|---|---|---|---|
| K | −2.03771E+02 | −1.81819E−02 | −5.00461E+00 | −3.13025E−01 | −6.48206E−02 | 1.08551E+02 |
| a4 | 2.07884E−03 | −7.57710E−03 | 3.27312E−03 | −1.72388E−03 | −2.26761E−02 | 6.69189E−03 |
| a6 | −8.07452E−05 | 2.57065E−05 | 6.89163E−05 | 2.78942E−04 | −2.37787E−03 | −3.05768E−04 |
| a8 | 5.55986E−06 | 8.60823E−07 | 2.62303E−07 | 1.57774E−05 | 6.07899E−04 | 1.10140E−03 |
| a10 | −2.04360E−07 | −3.73298E−08 | 9.11250E−08 | 4.83860E−06 | −1.38080E−05 | −6.15178E−05 |
| a12 | 5.91216E−09 | −1.05860E−08 | 2.14235E−08 | 6.92729E−07 | −3.90632E−06 | |
| a14 | | | | | | |
| a16 | | | | | | |

| Surface # | R7 | R8 | R8 | R10 | R11 | R12 |
|---|---|---|---|---|---|---|
| K | 3.24553E+00 | −1.04438E+00 | 8.57320E+00 | −2.15044E+00 | 3.07651E+01 | −4.44894E−01 |
| a4 | 1.80205E−02 | 2.04151E−02 | 2.46408E−03 | 1.86235E−03 | −3.07535E−02 | −3.49252E−02 |
| a6 | 6.89736E−03 | 3.39198E−03 | 4.17454E−04 | 6.82115E−06 | −3.51405E−04 | 2.94732E−03 |
| a8 | 5.37578E−03 | 6.17235E−03 | −1.56201E−04 | 2.31711E−05 | 1.67567E−05 | −1.69449E−04 |
| a10 | 1.37980E−03 | 3.46637E−03 | 2.41713E−05 | −2.94688E−06 | 1.95617E−06 | 2.87562E−06 |
| a12 | 9.19997E−16 | 2.21137E−15 | | −3.79008E−06 | −1.33525E−07 | 1.44025E−08 |
| a14 | | | | | | |
| a16 | | | | | | |

Figure 2A:
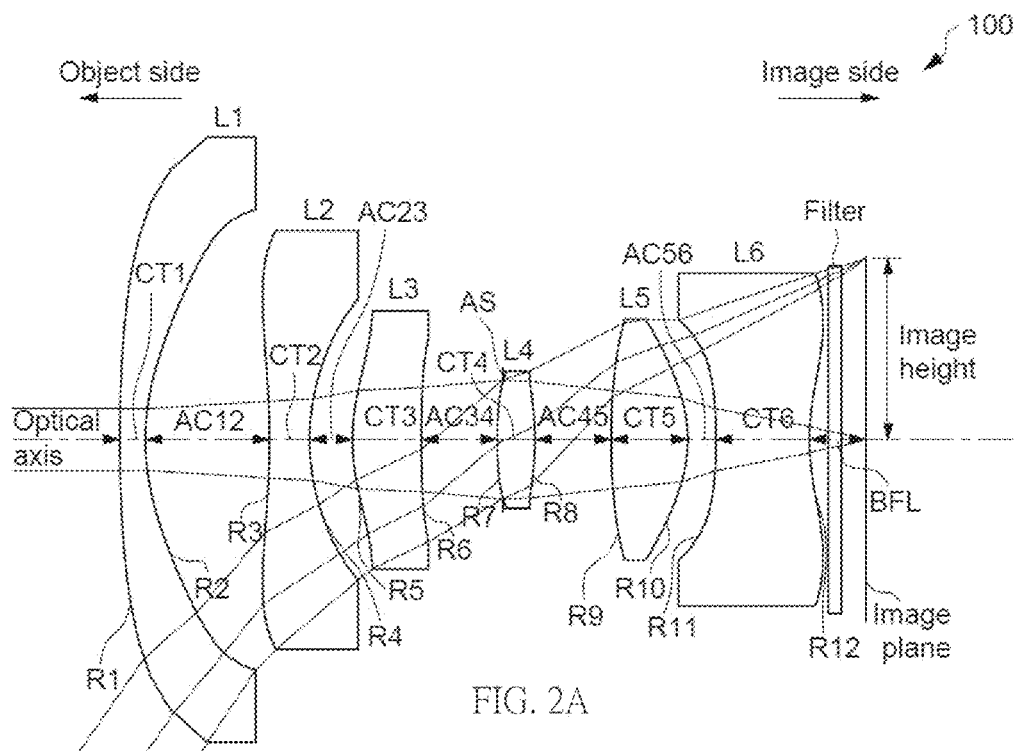
FIG. 2A is a simplified cross-section view of a six-element optical lens system according to a first embodiment of the present invention.
Figure 2B:
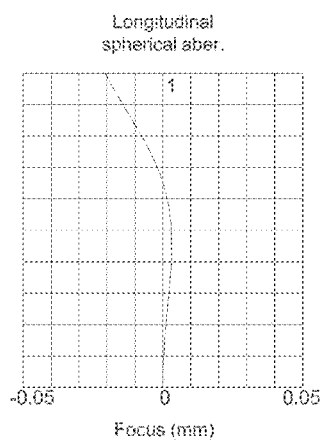
FIGS. 2B, 2C, and 2D are graphs illustrating the respective longitudinal spherical aberration, astigmatic field curvatures, and distortion in the embodiment of FIG. 2A.
Figure 2C:
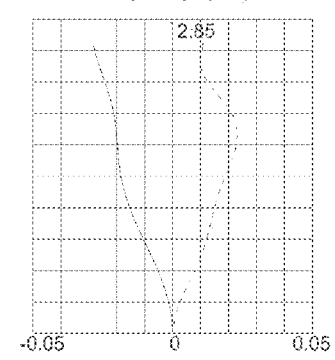
Figure 2D:
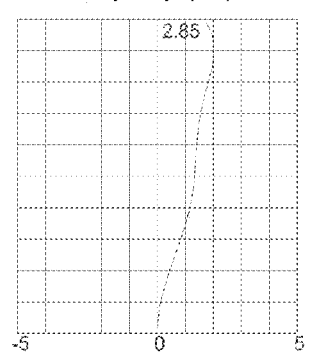

FIGS. 2B, 2C, and 2D are graphs illustrating the respective longitudinal spherical aberration, astigmatic field curvatures, and distortion for a wavelength of 940 nm in optical lens system 100 of FIG. 2A. The longitudinal spherical aberration and astigmatic curvature are less than ±0.025 mm and the distortion is less than +2.5 percent.

Second Embodiment

Figure 3A:
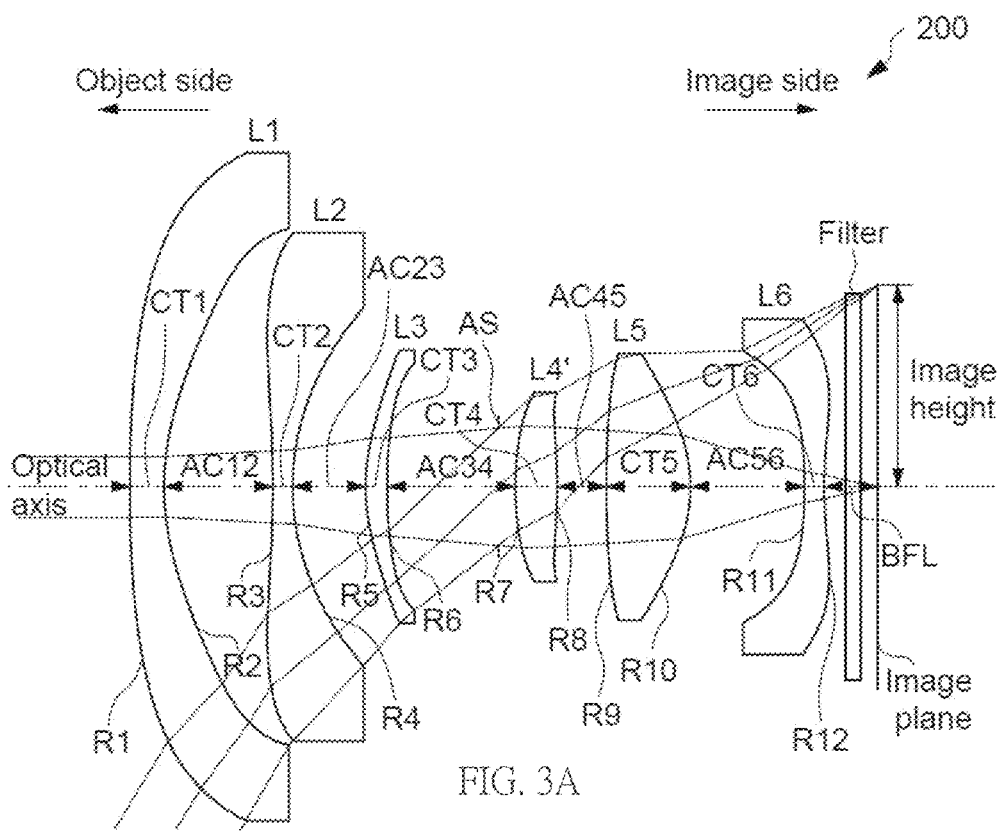
FIG. 3A is a simplified cross-section view of a six-element optical lens system according to a second embodiment of the present invention.

FIG. 3A is a simplified cross sectional view of a six-element optical lens system 200 according to a second embodiment of the present invention. Optical lens system 200 has a similar structure to optical lens system 100, except that the fourth lens element L4' has a convex surface on the image side in the vicinity of the optical axis and a concave surface in the outer circumferential region on the image side.

Table 2A shows numeric lens data of the lenses of optical lens system 200 according to the second embodiment of the present invention.

TABLE 2A

| Embod. 2 | Curvature Radius (mm) | Thickness/ air gap (mm) | Refractive index | Abbe # | material | Focal length (mm) |
|---|---|---|---|---|---|---|
| Object | Infinity | Infinity | | | | |
| Lens 1 | 23.654 | 0.481 | 1.535 | 56.114 | plastic | −8.120 |
| | 3.647 | 1.534 | | | | |
| Lens 2 | −15.380 | 0.280 | 1.535 | 56.114 | plastic | −5.146 |
| | 3.378 | 1.032 | | | | |
| Lens 3 | 2.834 | 0.305 | 1.535 | 56.114 | plastic | 8.043 |
| | 7.979 | 1.568 | | | | |
| Ape. Stop | Infinity | 0.242 | | | | |
| Lens 4 | 4.676 | 0.589 | 1.535 | 56.114 | plastic | 5.449 |
| | −7.418 | 0.693 | | | | |
| Lens 5 | 15.925 | 1.185 | 1.535 | 56.114 | plastic | 3.471 |
| | −2.049 | 1.606 | | | | |
| Lens 6 | −8.500 | 0.280 | 1.535 | 56.114 | plastic | −5.931 |
| | 5.128 | 0.302 | | | | |
| filter | Infinity | 0.210 | | | | |
| | Infinity | 0.242 | | | | |
| Image Plane | Infinity | | | | | |

In the second embodiment, the effective focal length (EFL) is 1.733 mm, the half field of view (HFOV) is 58.822 degrees. The F number is 2.0. The image height is 2.85 mm. The BFL is 0.74 mm. The total length from the object-side surface of the first lens element to the image plane is 10.549 mm.

Table 2B shows numeric values of the conic constant K and aspheric surface coefficients for each of the aspheric lens surfaces of the second embodiment.

TABLE 2B

| Embod. 2 | R1 | R2 | R3 | R4 | R5 | R6 |
|---|---|---|---|---|---|---|
| K | −5.36180E+01 | −5.04973E−02 | −5.61502E+00 | −4.40495E−01 | 6.01439E−02 | 7.97938E+00 |
| a4 | 2.19083E−03 | −7.80368E−03 | 3.23038E−03 | −2.13563E−03 | −2.17715E−02 | 1.67980E+01 |
| a6 | −3.93475E−05 | 3.29233E−05 | 4.44180E−05 | 2.49344E−04 | −2.04017E−03 | 5.89733E−03 |
| a8 | 5.63310E−07 | 1.72872E−06 | −1.30867E−06 | −5.75939E−06 | 6.91081E−04 | −1.62980E−03 |
| a10 | 4.15882E−08 | 3.43769E−08 | 9.41452E−09 | 1.84203E−06 | −4.27983E−06 | 1.07025E−03 |
| a12 | 2.27133E−09 | −1.86324E−09 | 1.76116E−08 | −2.46806E−07 | −5.99700E−06 | 1.23061E−05 |
| a14 | | | | | | 1.00095E−11 |
| a16 | | | | | | |

TABLE 2B-continued

| | R7 | R8 | R9 | R10 | R11 | R12 |
|---|---|---|---|---|---|---|
| K | −4.30725E+00 | −4.32687E+00 | 5.48235E+00 | −2.04648E+00 | 9.65495E+00 | −7.95403E−01 |
| a4 | 1.50746E−02 | 2.03037E−02 | 1.43681E−03 | 2.60695E−03 | −3.64955E−02 | −3.53309E−02 |
| a6 | 3.07813E−03 | −1.38054E−03 | 6.74680E−04 | 1.75671E−04 | −6.51204E−04 | 1.83952E−03 |
| a8 | 3.24639E−03 | 5.20570E−03 | −7.56299E−05 | 2.37437E−05 | −1.26568E−04 | −2.40054E−04 |
| a10 | −6.17383E−04 | 1.18892E−04 | 3.06126E−05 | −2.42133E−07 | −3.74563E−05 | 1.74444E−05 |
| a12 | 2.38071E−12 | −2.31087E−12 | | −2.82655E−06 | −1.13067E−05 | 2.55642E−06 |
| a14 | | | | | | |
| a16 | | | | | | |

Figures 3B, 3C, 3D:
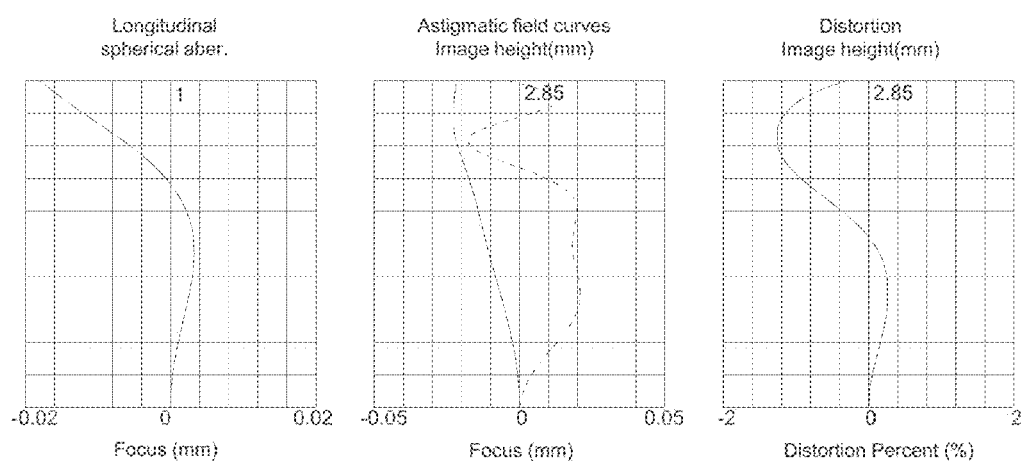
FIGS. 3B, 3C, and 3D are graphs illustrating the respective longitudinal spherical aberration, astigmatic field curvatures, and distortion in the embodiment of FIG. 3A.

FIGS. 3B, 3C, and 3D are graphs illustrating the respective longitudinal spherical aberration, astigmatic field curvatures, and distortion for a wavelength of 940 nm in optical lens system 200 of FIG. 3A. The longitudinal spherical aberration and astigmatic curvature are less than ±0.02 mm and the distortion is less than ±2.0 percent.

Third Embodiment

FIG. 4A is a simplified cross sectional view of a sixth-element optical lens system 300 according to a third embodiment of the present invention. Optical lens system 300 has a similar structure to optical lens system 100.

Table 3A shows numeric lens data of the lenses of optical lens system 300 according to the third embodiment of the present invention.

TABLE 3A

| Embod. 3 | Curvature Radius (mm) | Thickness/ air gap (mm) | Index | Abbe # | material | Focal length (mm) |
|---|---|---|---|---|---|---|
| Object | Infinity | Infinity | | | | |
| Lens 1 | 26.186 | 0.400 | 1.535 | 56.114 | plastic | −8.277 |
| | 3.770 | 1.249 | | | | |

TABLE 3A-continued

| Embod. 3 | Curvature Radius (mm) | Thickness/ air gap (mm) | Index | Abbe # | material | Focal length (mm) |
|---|---|---|---|---|---|---|
| Lens 2 | −12.351 | 0.477 | 1.535 | 56.114 | plastic | −5.358 |
| | 3.787 | 0.78e8 | | | | |
| Lens 3 | 3.213 | 0.300 | 1.535 | 56.114 | plastic | 9.714 |
| | 8.134 | 2.202 | | | | |
| Ape.Stop | Infinity | −0.097 | | | | |
| Lens 4 | 6.992 | 0.738 | 1.535 | 56.114 | plastic | 5.648 |
| | −5.133 | 1.720 | | | | |
| Lens 5 | 9.487 | 1.394 | 1.535 | 56.114 | plastic | 4.142 |
| | −2.746 | 1.943 | | | | |
| Lens 6 | −8.214 | 0.300 | 1.535 | 56.114 | plastic | −6.457 |
| | 6.046 | 0.302 | | | | |
| filter | Infinity | 0.210 | | | | |
| | Infinity | 0.236 | | | | |
| Image Plane | Infinity | | | | | |

In the third embodiment, the effective focal length (EFL) is 2.132 mm, the half field of view (HFOV) is 53.308 degrees. The F number is 2.0. The image height is 2.85 mm. The BFL is 0.748 mm. The total length from the object-side surface of the first lens element to the image plane is 12.161 mm.

Table 3B shows numeric values of the conic constant K and aspheric surface coefficients for each of the aspheric lens surfaces of the third embodiment.

TABLE 3B

| Embod. 3 | R1 | R2 | R3 | R4 | R5 | R6 |
|---|---|---|---|---|---|---|
| K | −2.41797E+01 | −3.42993E−03 | 1.07691E+00 | −1.68831E−01 | 4.34058E−02 | −1.24882E+00 |
| a4 | 2.23161E−03 | −8.19325E−03 | 2.95371E−03 | −1.14240E−03 | −2.13957E−02 | 4.53727E−03 |
| a6 | −3.25703E−05 | 1.18875E−05 | 5.17556E−05 | 4.76830E−04 | −2.22027E−03 | −1.79408E−03 |
| a8 | 4.08909E−07 | 6.50448E−07 | −2.89185E−07 | 5.26321E−06 | 6.28365E−04 | 9.53789E−04 |
| a10 | 2.69587E−08 | 4.10730E−08 | 6.86275E−08 | 3.40888E−06 | −2.34094E−05 | −1.13578E−05 |
| a12 | 1.63668E−09 | 2.84075E−09 | 1.12624E−08 | 1.62121E−07 | −3.03837E−15 | 5.16858E−16 |
| a14 | | | | | | |
| a16 | | | | | | |

| | R7 | R8 | R9 | R10 | R11 | R12 |
|---|---|---|---|---|---|---|
| K | −2.14077E+00 | −3.26247E−02 | 1.17669E+00 | −2.39763E+00 | 6.16273E+00 | 2.47302E+00 |
| a4 | 1.55156E−02 | 1.94279E−02 | 9.86500E−04 | 2.92490E−03 | −1.87578E−02 | −3.30567E−02 |
| a6 | 3.47411E−03 | −7.39801E−04 | 6.82800E−04 | 3.14901E−05 | −4.73403E−04 | 3.53134E−03 |
| a8 | 3.33349E−03 | 5.23470E−03 | −1.06739E−04 | −4.14113E−06 | −4.83304E−05 | −1.95822E−04 |
| a10 | −6.95980E−04 | −1.72146E−04 | 9.77691E−06 | −2.15257E−08 | −2.96489E−06 | 4.73258E−06 |
| a12 | −2.60599E−18 | −1.99462E−17 | | −3.65041E−08 | 4.40327E−16 | −2.53819E−15 |

FIGS. 4B, 4C, and 4D are graphs illustrating the respective longitudinal spherical aberration, astigmatic filed curvatures, and distortion for a wavelength of 940 nm in optical lens system 300 of FIG. 4A. The longitudinal spherical aberration is less than ±0.02 mm, the astigmatic curvature is less than ±0.025 mm, and the distortion is less than −2.0 percent.

Fourth Embodiment

Figure 5A:
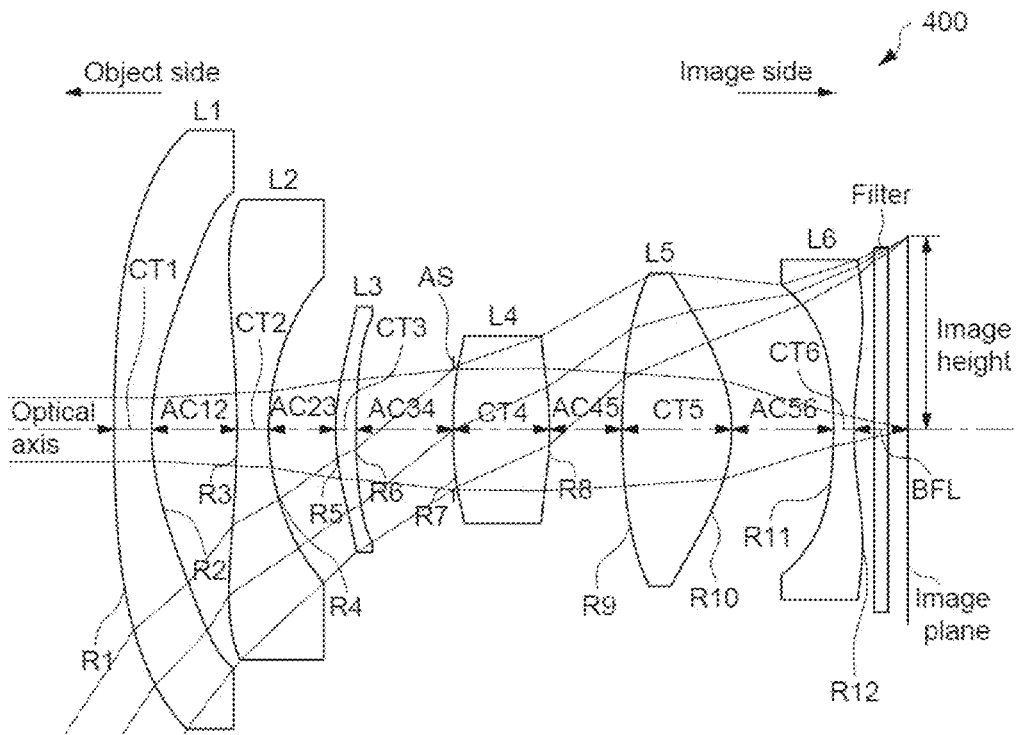
FIG. 5A is a simplified cross-section view of a six-element optical lens system according to a fourth embodiment of the present invention.

FIG. 5A is a simplified cross sectional view of a sixth-element optical lens system 400 according to a fourth embodiment of the present invention. Optical lens system 400 has a similar structure to optical lens system 100.

Table 4A shows numeric lens data of the lenses of optical lens system 400 according to the fourth embodiment of the present invention.

TABLE 4A

| Embod. 4 | Curvature Radius (mm) | Thickness/ air gap (mm) | Index | Abbe # | material | Focal length (mm) |
|---|---|---|---|---|---|---|
| Object | Infinity | Infinity | | | | |
| Lens 1 | 27.038 | 0.555 | 1.535 | 56.114 | plastic | −8.265 |
| | 3.776 | 1.261 | | | | |
| Lens 2 | −12.872 | 0.469 | 1.535 | 56.114 | plastic | −5.223 |
| | 3.619 | 0.989 | | | | |
| Lens 3 | 3.278 | 0.300 | 1.535 | 56.114 | plastic | 9.198 |
| | 9.491 | 1.434 | | | | |
| Ape.Stop | Infinity | 0.000 | | | | |
| Lens 4 | 6.896 | 1.424 | 1.535 | 56.114 | plastic | 5.614 |
| | −4.945 | 1.073 | | | | |
| Lens 5 | 9.041 | 1.622 | 1.535 | 56.114 | plastic | 3.455 |
| | −2.180 | 1.503 | | | | |
| Lens 6 | −8.476 | 0.300 | 1.535 | 56.114 | plastic | −5.452 |
| | 4.507 | 0.302 | | | | |
| filter | Infinity | 0.210 | | | | |
| | Infinity | 0.292 | | | | |
| Image Plane | Infinity | | | | | |

In the fourth embodiment, the effective focal length is 1.892 mm, the half field of view (HFOV) is 56.499 degrees. The F number is 2.0. The image height is 2.85 mm. The BFL is 0.804 mm. The total length from the object-side surface of the first lens element to the image plane is 11.735 mm.

Table 4B shows numeric values of the conic constant K and aspheric surface coefficients $\alpha_i$ for each of the aspheric lens surfaces of the fourth embodiment.

Figures 5B, 5C, 5D:
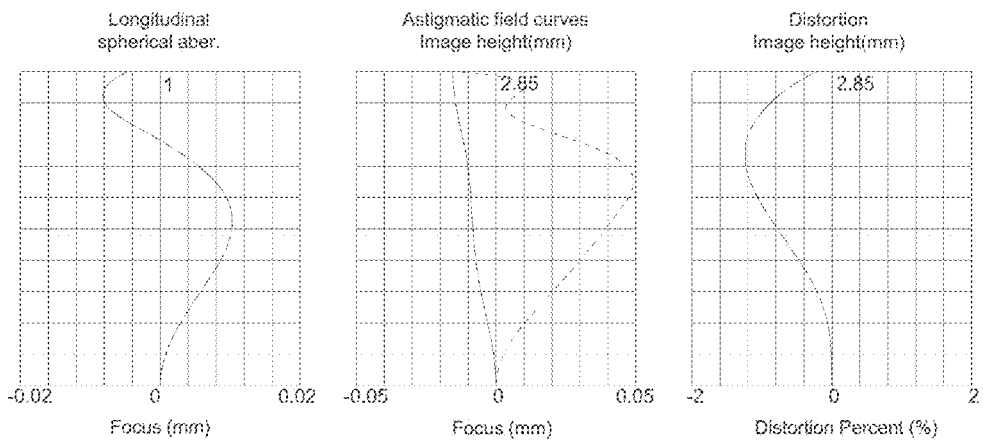
FIGS. 5B, 5C, and 5D are graphs illustrating the respective longitudinal spherical aberration, astigmatic field curvatures, and distortion in the embodiment of 5A.

FIGS. 5B, 5C, and 5D are graphs illustrating the respective longitudinal spherical aberration, astigmatic filed curvatures, and distortion for a wavelength of 940 nm in the fourth embodiment of the optical lens system. The longitudinal spherical aberration is less than ±0.015 mm, the astigmatic curvature is less than ±0.025 mm, and the distortion is less than 1.5 percent.

Fifth Embodiment

Figure 6A:
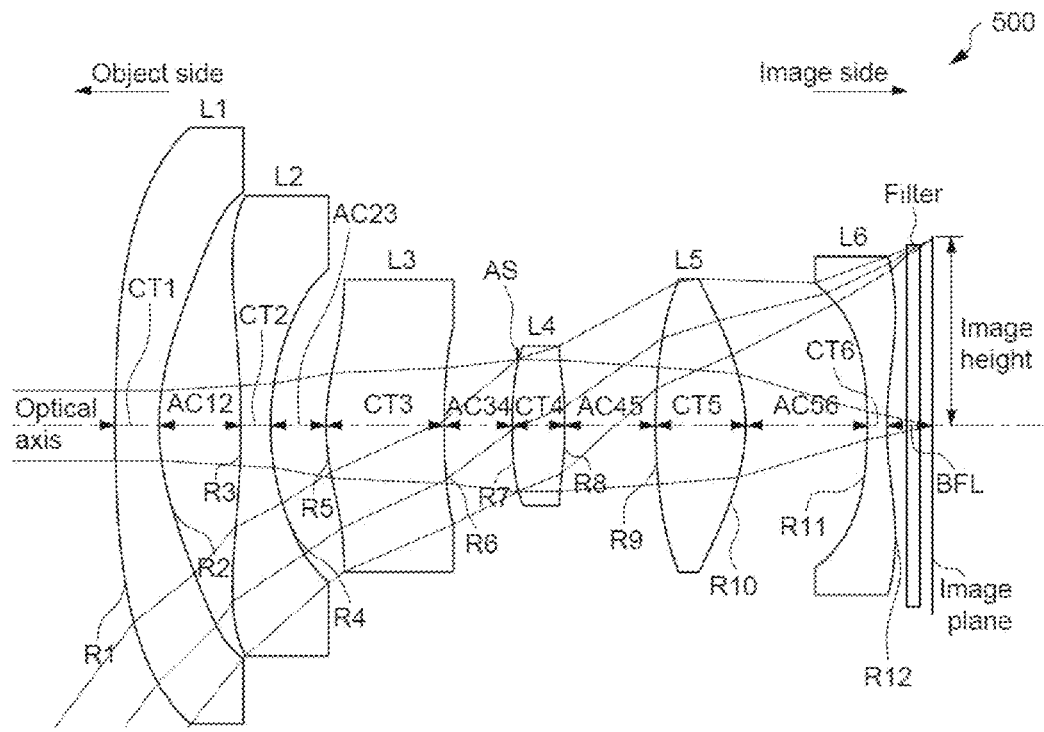
FIG. 6A is a simplified cross-section view of a six-element optical lens system according to a fifth embodiment of the present invention.

FIG. 6A is a simplified cross sectional view of a six-element optical lens system 500 according to a fifth embodiment of the present invention. Optical lens system 500 has a similar structure to optical lens system 100.

Table 5A shows numeric lens data of the lenses of optical lens system 500 according to the third embodiment of the present invention.

TABLE 5A

| Embod. 5 | Curvature Radius (mm) | Thickness/ air gap (mm) | Index | Abbe # | material | Focal length (mm) |
|---|---|---|---|---|---|---|
| Object | Infinity | Infinity | | | | |
| Lens 1 | 26.243 | 0.668 | 1.535 | 56.114 | plastic | −8.291 |
| | 3.763 | 1.248 | | | | |
| Lens 2 | −12.499 | 0.453 | 1.535 | 56.114 | plastic | −5.484 |
| | 3.886 | 0.847 | | | | |
| Lens 3 | 3.384 | 1.801 | 1.535 | 56.114 | plastic | 8.380 |
| | 11.209 | 1.115 | | | | |
| Ape.Stop | Infinity | −0.081 | | | | |
| Lens 4 | 6.820 | 0.807 | 1.535 | 56.114 | plastic | 5.467 |
| | −4.917 | 1.381 | | | | |
| Lens 5 | 9.128 | 1.372 | 1.535 | 56.114 | plastic | 4.032 |
| | −2.680 | 1.855 | | | | |
| Lens 6 | −8.133 | 0.300 | 1.535 | 56.114 | plastic | −5.572 |
| | 4.773 | 0.302 | | | | |
| filter | Infinity | 0.210 | | | | |
| | Infinity | 0.183 | | | | |
| Image Plane | Infinity | | | | | |

In the fifth embodiment, the effective focal length (EFL) is 2.16 mm, the half field of view (HFOV) is 52.999 degrees. The F number is 2.0. The image height is 2.85 mm. The BFL is 0.695 mm. The total length from the object-side surface of the first lens element to the image plane is 12.461 mm.

Table 5B shows numeric values of the conic constant K and aspheric surface coefficients for each of the aspheric lens surfaces of the fifth embodiment.

TABLE 4B

| Embod. 4 | R1 | R2 | R3 | R4 | R5 | R6 |
|---|---|---|---|---|---|---|
| K | −3.25531E+01 | −9.70421E−03 | 8.63128E−01 | −2.23477E−01 | 5.12026E−02 | 4.45304E+00 |
| a4 | 2.11371E−03 | −8.13975E−03 | 2.98667E−03 | −1.19524E−03 | −2.20647E−02 | 4.90186E−03 |
| a6 | −3.41331E−05 | 8.77091E−06 | 4.86836E−05 | 4.17430E−04 | −2.24664E−03 | −1.20928E−03 |
| a8 | 3.50044E−07 | 6.45225E−07 | −8.16077E−07 | 9.42370E−06 | 6.60464E−04 | 1.21015E−03 |
| a10 | 2.56901E−08 | 4.35480E−08 | 2.91907E−08 | 2.53978E−06 | 4.83549E−06 | 4.43439E−05 |
| a12 | 1.64606E−09 | 3.17040E−09 | 1.76153E−08 | 2.88332E−09 | −6.17883E−15 | −1.38410E−16 |
| a14 | | 0.00000E+00 | | | | |
| a16 | | | | | | |

| Surface # | R7 | R8 | R9 | R10 | R11 | R12 |
|---|---|---|---|---|---|---|
| K | −5.89259E+00 | −3.70432E−01 | 1.56390E+00 | −2.12333E+00 | 6.86488E+00 | 4.34556E−01 |
| a4 | 1.41971E−02 | 2.00486E−02 | 1.04312E−03 | 2.48599E−03 | −1.86553E−02 | −3.30827E−02 |
| a6 | 2.73194E−03 | −4.04790E−03 | 7.02330E−04 | 2.95905E−03 | −3.86344E−04 | 3.30513E−03 |
| a8 | 1.95404E−03 | 3.69134E−03 | −1.01314E−04 | −5.86036E−06 | −3.32601E−05 | −2.35956E−04 |
| a10 | −2.54538E−03 | −6.01246E−04 | 7.92443E−06 | 7.23587E−07 | −1.95172E−06 | 1.21795E−05 |
| a12 | 1.52202E−16 | 1.79841E−17 | | −1.63188E−11 | −1.33541E−09 | −6.03791E−09 |
| a14 | | | | | | |
| a16 | | | | | | |

TABLE 5B

| Embod. 5 | R1 | R2 | R3 | R4 | R5 | R6 |
|---|---|---|---|---|---|---|
| K | −1.18346E+02 | −1.49848E−03 | 1.12366E+00 | −5.04874E−01 | −3.45202E−02 | −8.44867E+00 |
| a4 | 2.09341E−03 | −8.11772E−03 | 2.96265E−03 | −2.30072E−03 | −2.19047E−02 | 4.16452E−03 |
| a6 | −2.97181E−05 | 1.13097E−05 | 4.65955E−05 | 4.06872E−04 | −2.41495E−03 | −1.08945E−03 |
| a8 | 4.10200E−07 | 8.03689E−07 | −8.12007E−07 | 3.46613E−05 | 5.81591E−04 | 1.17771E−03 |
| a10 | 2.35589E−08 | 4.40653E−08 | 3.04519E−08 | 1.04227E−05 | −2.60186E−05 | 1.06420E−05 |
| a12 | 1.26315E−09 | 7.45206E−10 | 1.65104E−08 | 1.63795E−14 | −1.39363E−14 | 6.09718E−16 |
| a14 | | | | 0.00000E+00 | | |
| a16 | | | | | | |
| Surface # | R7 | R8 | R9 | R10 | R11 | R12 |
| K | −1.85047E+00 | −1.84600E−01 | 5.01848E−01 | −2.30263E+00 | 5.90408E+00 | −3.79074E−01 |
| a4 | 1.56326E−02 | 1.94583E−02 | 8.89751E−04 | 2.88430E−03 | −1.90145E−02 | −2.86308E−02 |
| a6 | 4.94556E−03 | −7.94947E−05 | 7.04487E−04 | 3.80649E−05 | −1.30649E−04 | 2.96639E−03 |
| a8 | 3.82767E−03 | 5.55195E−03 | −1.01316E−04 | −5.68015E−06 | −1.06082E−05 | −2.15615E−04 |
| a10 | −9.58567E−04 | −2.10790E−04 | 8.87836E−06 | 1.65663E−07 | −1.95399E−06 | 8.06539E−06 |
| a12 | −1.25386E−17 | 2.14083E−17 | | 5.78830E−15 | 5.42594E−16 | −6.80377E−15 |
| a14 | | | | | 0.00000E+00 | 0.00000E+00 |
| a16 | | | | | | |

Figures 6B, 6C, 6D:
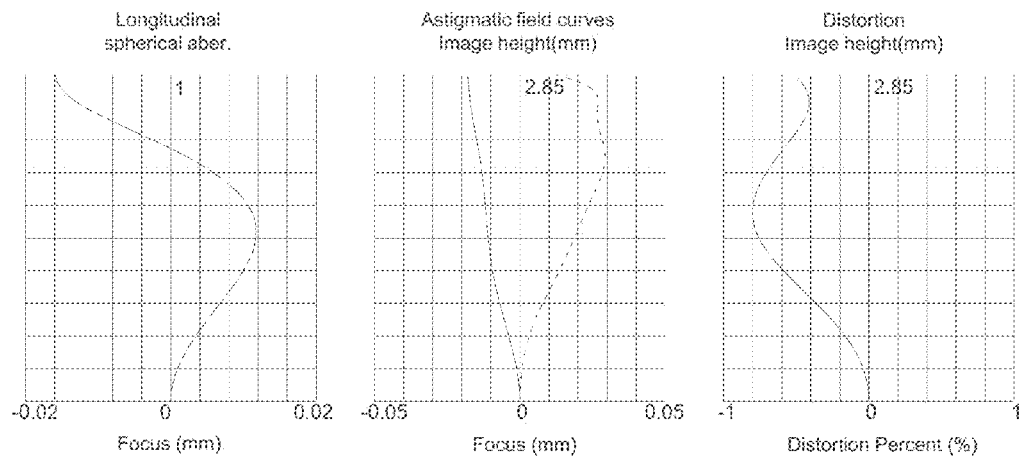
FIGS. 6B, 6C, and 6D are graphs illustrating the respective longitudinal spherical aberration, astigmatic field curvatures, and distortion in the embodiment of FIG. 6A.

FIGS. 6B, 6C, and 6D are graphs illustrating the respective longitudinal spherical aberration, astigmatic filed curvatures, and distortion for a wavelength of 940 nm in optical lens system 500 of FIG. 6A. The longitudinal spherical aberration is less than ±0.02 mm, the astigmatic curvature is less than ±0.025 mm, and the distortion is less than 1.0 percent.

Sixth Embodiment

Figure 7A:
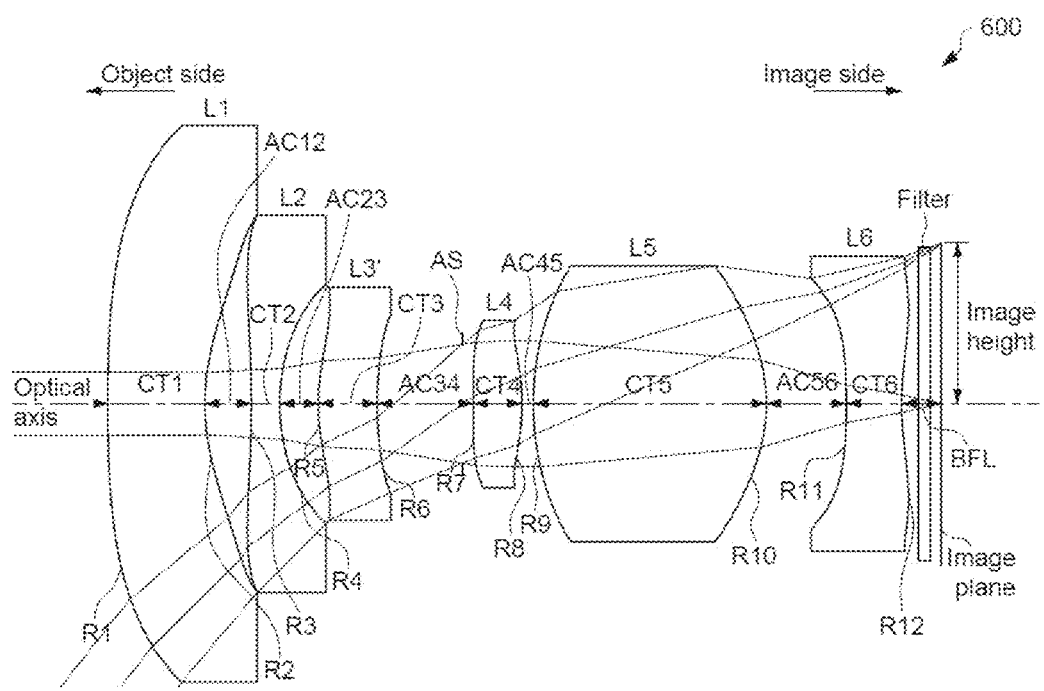
FIG. 7A is a simplified cross-section view of a six-element optical lens system according to a sixth embodiment of the present invention.

FIG. 7A is a simplified cross sectional view of a sixth-element optical lens system 600 according to a sixth embodiment of the present invention. Optical lens system 600 has a similar structure to optical lens system 100, except that the third lens element L3' has a convex object-side surface in the vicinity of the optical axis and a concave object-side surface in the outer circumferential region and the fourth lens element L4 has a convex image-side surface in the vicinity of the optical axis and a concave image-side surface in the outer circumferential region.

Table 6A shows numeric lens data of the lenses of optical lens system 600 according to the sixth embodiment of the present invention.

TABLE 6A

| Embod. 6 | Curvature Radius (mm) | Thickness/ air gap (mm) | Refractive index | Abbe # | material | Focal length (mm) |
|---|---|---|---|---|---|---|
| Object | Infinity | Infinity | | | | |
| Lens 1 | 31.903 | 1.730 | 1.535 | 56.114 | plastic | −8.547 |
|  | 3.926 | 0.827 | | | | |
| Lens 2 | −18.417 | 0.506 | 1.535 | 56.114 | plastic | −5.490 |
|  | 3.531 | 0.689 | | | | |
| Lens 3 | 3.708 | 1.049 | 1.535 | 56.114 | plastic | 13.524 |
|  | 6.850 | 1.520 | | | | |
| Ape.Stop | Infinity | 0.189 | | | | |
| Lens 4 | 44.651 | 0.869 | 1.535 | 56.114 | plastic | 6.778 |
|  | −3.923 | 0.207 | | | | |
| Lens 5 | 5.240 | 4.152 | 1.535 | 56.114 | plastic | 4.211 |
|  | −2.864 | 1.420 | | | | |
| Lens 6 | −15.865 | 0.989 | 1.535 | 56.114 | plastic | −7.229 |
|  | 5.231 | 0.302 | | | | |
| filter | Infinity | 0.210 | | | | |
|  | Infinity | 0.174 | | | | |
| Image Plane | Infinity | | | | | |

In the sixth embodiment, the effective focal length (EFL) is 2.266 mm, the half field of view (HFOV) is 51.593 degrees. The F number is 2.0. The image height is 2.85 mm. The BFL is 0.686 mm. The total length from the object-side surface of the first lens element to the image plane is 14.834 mm.

Table 6B shows numeric values of the conic constant K and aspheric surface coefficients for each of the aspheric lens surfaces of the fifth embodiment.

TABLE 6B

| Embod. 6 | R1 | R2 | R3 | R4 | R5 | R6 |
|---|---|---|---|---|---|---|
| K | −6.21760E+01 | −2.18392E−03 | 7.00616E+00 | 1.38999E−01 | −5.70932E−02 | −1.64911E+00 |
| a4 | 1.88908E−03 | −8.88808E−03 | 2.71596E−03 | −1.02554E−05 | −2.26607E−02 | 4.38789E−03 |
| a6 | −2.49736E−05 | 1.70166E−05 | 2.83646E−05 | 6.02682E−04 | −2.36188E−03 | −1.90324E−03 |
| a8 | 2.82968E−07 | 2.99768E−06 | −2.01795E−06 | 4.13811E−05 | 5.97596E−04 | 1.11179E−03 |
| a10 | 7.11891E−09 | 2.93960E−07 | 3.50157E−08 | 1.62578E−05 | −2.61758E−05 | 1.91114E−04 |
| a12 | 3.77906E−10 | 2.11829E−08 | 3.61243E−08 | 9.60172E−10 | −3.32005E−10 | 2.87924E−09 |
| a14 | | | | | | |
| a16 | | | | | | |

TABLE 6B-continued

| Surface # | R7 | R8 | R9 | R10 | R11 | R12 |
|---|---|---|---|---|---|---|
| K | 1.78011E+01 | 5.70162E−01 | −2.97163E−02 | −2.12749E+00 | −1.33842E+02 | 1.58160E+00 |
| a4 | 1.62484E−02 | 1.81520E−02 | 8.20369E−04 | 1.44932E−03 | −2.22613E−02 | −2.38379E−02 |
| a6 | 6.21129E−03 | 4.68072E−04 | 3.38082E−04 | −2.20879E−04 | −8.54165E−06 | 1.17819E−03 |
| a8 | 2.72364E−03 | 4.60696E−03 | −5.32971E−05 | −2.42074E−05 | 6.89816E−05 | −9.86484E−05 |
| a10 | −1.13432E−03 | −5.25081E−04 | 2.08844E−06 | 2.15885E−07 | −2.54564E−06 | 1.25850E−05 |
| a12 | −3.50980E−17 | 4.08930E−17 |  | 1.82524E−07 | 1.66609E−09 | −2.43131E−09 |
| a14 |  |  |  |  |  |  |
| a16 |  |  |  |  |  |  |

Figures 7B, 7C, 7D:
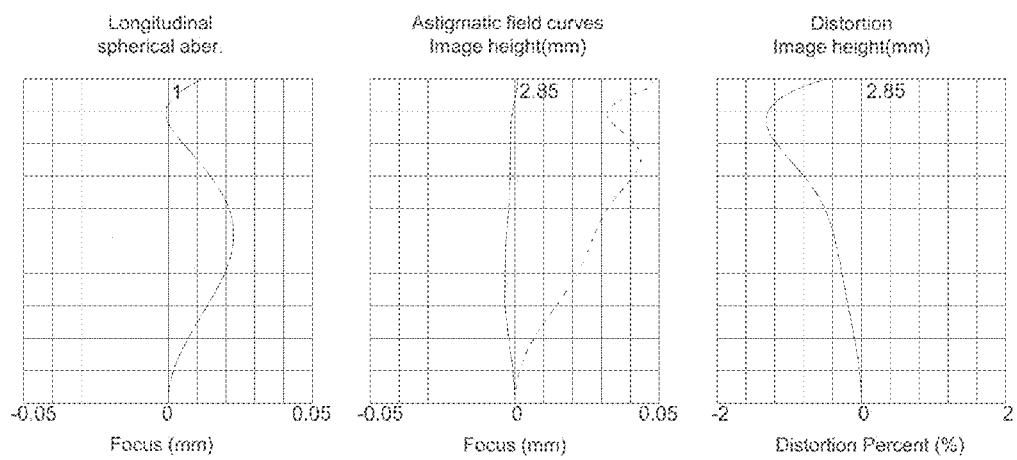
FIGS. 7B, 7C, and 7D are graphs illustrating the respective longitudinal spherical aberration, astigmatic field curvatures, and distortion in the embodiment of FIG. 7A.

FIGS. 7B, 7C, and 7D are graphs illustrating the respective longitudinal spherical aberration, astigmatic filed curvatures, and distortion for a wavelength of 940 nm of optical lens system 600 of FIG. 7A. The longitudinal spherical aberration is less than ±0.025 mm, the astigmatic curvature is less than ±0.050 mm, and the distortion is less than −2.0 percent.

Seventh Embodiment

FIG. 8A is a simplified cross sectional view of a sixth-element optical lens system 700 according to a seventh embodiment of the present invention. Optical lens system 700 has a similar structure to optical lens system 100, except that the fourth lens element L4″ has a convex image-side surface in the vicinity of the optical axis and a concave image-side surface in the outer circumferential region.

Table 7A shows numeric lens data of the lenses of optical lens system 700 according to the seventh embodiment of the present invention.

TABLE 7A

| Embod. 7 | Curvature Radius (mm) | Thickness (mm) | Index | Abbe # | material | Focal length (mm) |
|---|---|---|---|---|---|---|
| Object | Infinity | Infinity |  |  |  |  |
| Lens 1 | 28.609 | 0.880 | 1.535 | 56.114 | plastic | −8.054 |
|  | 3.707 | 1.370 |  |  |  |  |
| Lens 2 | −14.151 | 0.465 | 1.535 | 56.114 | plastic | −5.275 |
|  | 3.569 | 0.932 |  |  |  |  |
| Lens 3 | 3.225 | 0.662 | 1.535 | 56.114 | plastic | 11.162 |
|  | 6.505 | 1.452 |  |  |  |  |
| Ape. Stop | Infinity | 0.256 |  |  |  |  |
| Lens 4 | 7.784 | 0.769 | 1.535 | 56.114 | plastic | 6.934 |
|  | −6.853 | 0.344 |  |  |  |  |
| Lens 5 | 6.563 | 2.560 | 1.535 | 56.114 | plastic | 3.568 |
|  | −2.328 | 1.782 |  |  |  |  |
| Lens 6 | −34.058 | 0.366 | 1.535 | 56.114 | plastic | −6.981 |
|  | 4.214 | 0.302 |  |  |  |  |
| filter | Infinity | 0.210 |  |  |  |  |
|  | Infinity | 0.296 |  |  |  |  |
| Image Plane | Infinity |  |  |  |  |  |

In the seventh embodiment, the effective focal length is 1.858 mm, the half field of view (HFOV) is 57.164 degrees. The F number is 2.0. The image height is 2.85 mm. The BFL is 0.808 mm. The total length from the object-side surface of the first lens element to the image plane is 12.645 mm.

Table 7B shows numeric values of the conic constant K and aspheric surface coefficients for each of the aspheric lens surfaces of the seventh embodiment.

TABLE 7B

| Embod. 7 | R1 | R2 | R3 | R4 | R5 | R6 |
|---|---|---|---|---|---|---|
| K | −8.86635E+01 | −2.22500E−02 | −1.08326E+00 | −1.75600E−01 | 7.35524E−02 | 8.85341E+00 |
| a4 | 2.04669E−03 | −7.93242E−03 | 3.11380E−03 | −1.37120E−03 | −2.13175E−02 | 3.57390E−03 |
| a6 | −3.49186E−05 | 2.13144E−05 | 4.70952E−05 | 4.83962E−04 | −2.26924E−03 | −1.45592E−03 |
| a8 | 4.54420E−07 | 1.48592E−06 | −1.25818E−06 | 7.02265E−06 | 6.43886E−04 | 9.75455E−04 |
| a10 | 2.23901E−08 | 1.13684E−07 | −2.05615E−08 | 2.58496E−06 | −9.28528E−06 | 1.59082E−05 |
| a12 | 1.42215E−09 | 1.03862E−08 | 1.62187E−08 | 7.64270E−07 | −4.55546E−06 | 7.23138E−14 |
| a14 |  |  |  |  |  |  |
| a16 |  |  |  |  |  |  |

|  | R7 | R8 | R9 | R10 | R11 | R12 |
|---|---|---|---|---|---|---|
| K | −4.14758E−01 | −1.82431E+00 | 8.73351E−01 | −2.12619E+00 | 1.43686E+01 | −9.67952E−01 |
| a4 | 1.59654E−02 | 2.00729E−02 | 8.56518E−04 | 2.28169E−03 | −2.30039E−02 | −3.15229E−02 |
| a6 | 3.44094E−03 | −3.30222E−04 | 5.56142E−04 | −8.74738E−06 | −7.34225E−04 | 2.44396E−03 |
| a8 | 3.20323E−03 | 4.59584E−03 | −8.08332E−05 | −1.40492E−05 | −1.91003E−05 | −1.82790E−04 |
| a10 | −1.12349E−03 | −5.18007E−04 | 5.19317E−07 | −4.19393E−06 | 1.61940E−06 | 8.27644E−06 |
| a12 | −3.33560E−15 | 1.64798E−15 |  | −9.01291E−07 | 1.01442E−07 | 1.03927E−06 |
| a14 |  |  |  |  |  |  |
| a16 |  |  |  |  |  |  |

FIGS. 8B, 8C, and 8D are graphs illustrating the respective longitudinal spherical aberration, astigmatic field curvatures, and distortion for a wavelength of 940 nm of optical lens system of FIG. 8A. The longitudinal spherical aberration is less than ±0.02 mm, the astigmatic curvature is less than ±0.025 mm, and the distortion is less than ±2.5 percent.

Eighth Embodiment

Figure 9A:
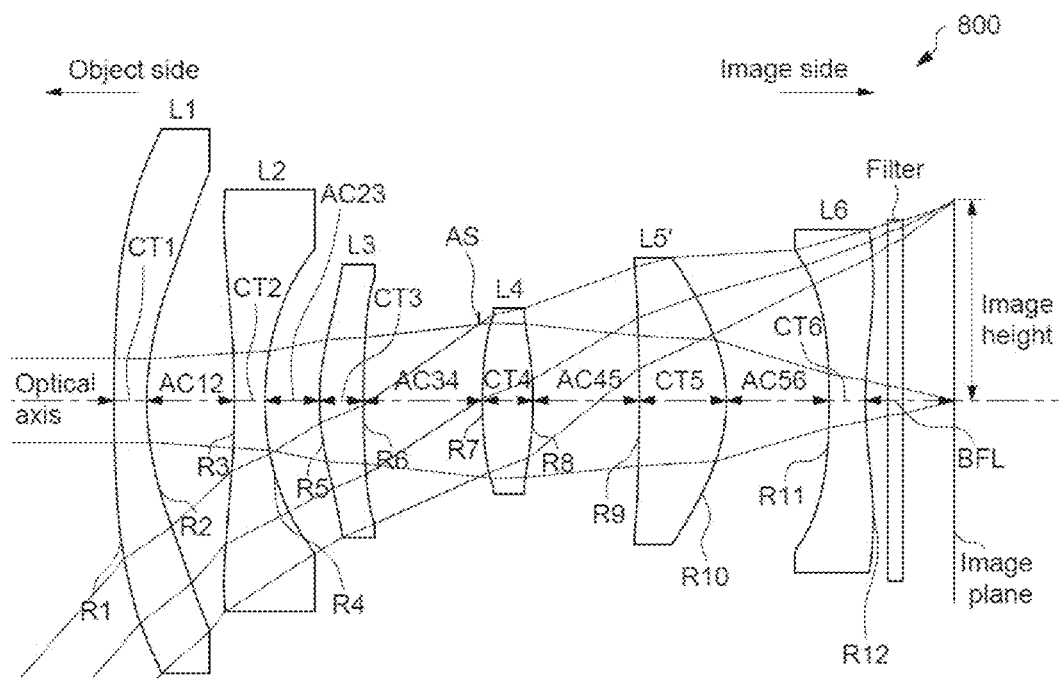
FIG. 9A is a simplified cross-section view of a six-element optical lens system according to an eighth embodiment of the present invention.

FIG. 9A is a simplified cross sectional view of a six-element optical lens system 800 according to an eighth embodiment of the present invention. Optical lens system 800 has a similar structure to optical lens system 100, except that the fifth lens element L5' has a concave object-side surface which having a concave object-side surface in the vicinity of the optical axis and a concave object-side surface in the outer circumferential region.

Table 8A shows numeric lens data of the lenses of optical lens system 800 according to the eighth embodiment of the present invention.

TABLE 8A

| Embod. 8 | Curvature Radius (mm) | Thickness/ air gap (mm) | Index | Abbe # | material | Focal length (mm) |
|---|---|---|---|---|---|---|
| Object | Infinity | Infinity | | | | |
| Lens 1 | 27.072 | 0.450 | 1.544 | 49.922 | plastic | −8.33 |
| | 3.813 | 1.203 | | | | |
| Lens 2 | −11.623 | 0.419 | 1.544 | 49.922 | plastic | −5.256 |
| | 3.769 | 0.750 | | | | |
| Lens 3 | 3.195 | 0.600 | 1.544 | 49.922 | plastic | 7.426 |
| | 15.076 | 1.586 | | | | |
| Ape.Stop | Infinity | 0.050 | | | | |
| Lens 4 | 6.930 | 0.693 | 1.544 | 49.922 | plastic | 5.039 |
| | −4.277 | 1.460 | | | | |
| Lens 5 | −29.860 | 1.193 | 1.544 | 49.922 | plastic | 4.413 |
| | −2.224 | 1.411 | | | | |
| Lens 6 | −11.315 | 0.500 | 1.544 | 49.922 | plastic | −6.468 |
| | 5.081 | 0.306 | | | | |
| filter | Infinity | 0.210 | | | | |
| | Infinity | 0.703 | | | | |

TABLE 8A-continued

| Embod. 8 | Curvature Radius (mm) | Thickness/ air gap (mm) | Index | Abbe # | material | Focal length (mm) |
|---|---|---|---|---|---|---|
| Image Plane | Infinity | | | | | |

In the eighth embodiment, the effective focal length is 2.433 mm, the half field of view (HFOV) is 49.079 degrees. The F number is 2.10. The image height is 2.754 mm. The BFL is 1.219 mm. The total length from the object-side surface of the first lens element to the image plane is 11.533 mm.

Table 8B shows numeric values of the conic constant K and aspheric surface coefficients for each of the aspheric lens surfaces of the eighth embodiment.

TABLE 8B

| Embod. 8 | R1 | R2 | R3 | R4 | R5 | R6 |
|---|---|---|---|---|---|---|
| K | 0.00000E+00 | 0.00000E+00 | 0.00000E+00 | 0.00000E−00 | 0.00000E+00 | 0.00000E+00 |
| a4 | 2.51341E−03 | −8.18010E−03 | 2.97294E−03 | 4.86542E−04 | −2.21572E−02 | 3.44803E−03 |
| a6 | −3.26524E−05 | 9.08078E−08 | 5.06998E−05 | 5.45014E−04 | −2.58174E−03 | −1.69940E−03 |
| a8 | 0.00000E+00 | 0.00000E+00 | 0.00000E+00 | 0.00000E+00 | 6.14775E−04 | 1.09041E−03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| | 0.00000E+00 | 0.00000E+00 | 0.00000E+00 | 0.00000E+00 | 0.00000E+00 | 0.00000E+00 |

| Surface # | R7 | R8 | R9 | R10 | R11 | R12 |
|---|---|---|---|---|---|---|
| K | 0.00000E+00 | 0.00000E+00 | 0.00000E+00 | −1.94957E+00 | 0.00000E+00 | 0.00000E+00 |
| a4 | 1.42425E−02 | 1.93811E−02 | −6.62404E−04 | 1.57155E−03 | −1.52437E−02 | −3.18172E−02 |
| a6 | 8.58232E−04 | −3.32211E−03 | 3.84240E−04 | −3.19767E−04 | −4.73889E−06 | 3.92465E−03 |
| a8 | 4.95764E−03 | 6.69892E−03 | −1.60899E−04 | 0.00000E+00 | 0.00000E+00 | −2.34302E−04 |
| a10 | −4.91744E−04 | 0.00000E+00 | 1.83977E−05 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

Figures 9B, 9C, 9D:
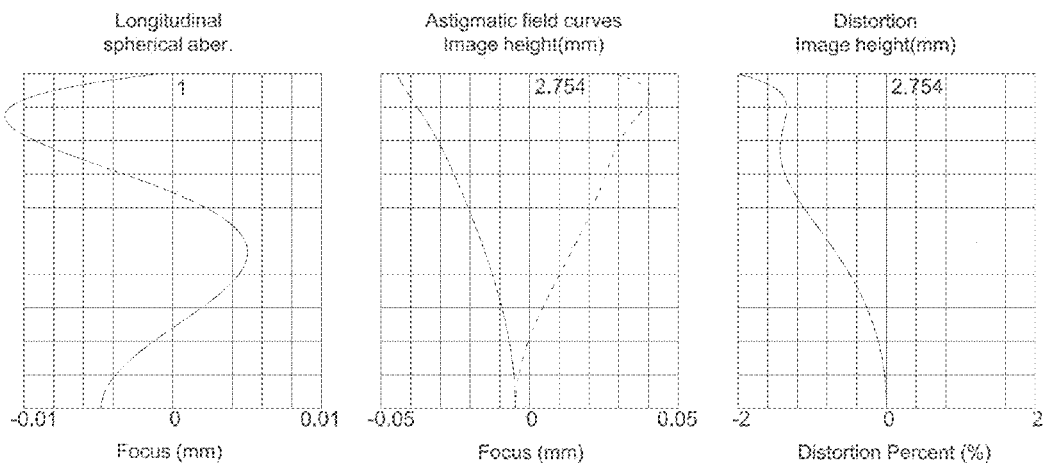
FIGS. 9B, 9C, and 9D are graphs illustrating the respective longitudinal aberration, sagittal and tangential curvatures, and distortion in the embodiment of FIG. 9A.

FIGS. 9B, 9C, and 9D are graphs illustrating the respective longitudinal aberration, sagittal and tangential field curvatures, and distortion for a wavelength of 940 nm in the optical lens system 800 of FIG. 9A. The longitudinal aberration is less than ±0.02 percent, the sagittal and tangential aberration is less than ±0.05 mm, and the distortion is less than −0.5 percent.

Ninth Embodiment

Figure 10A:
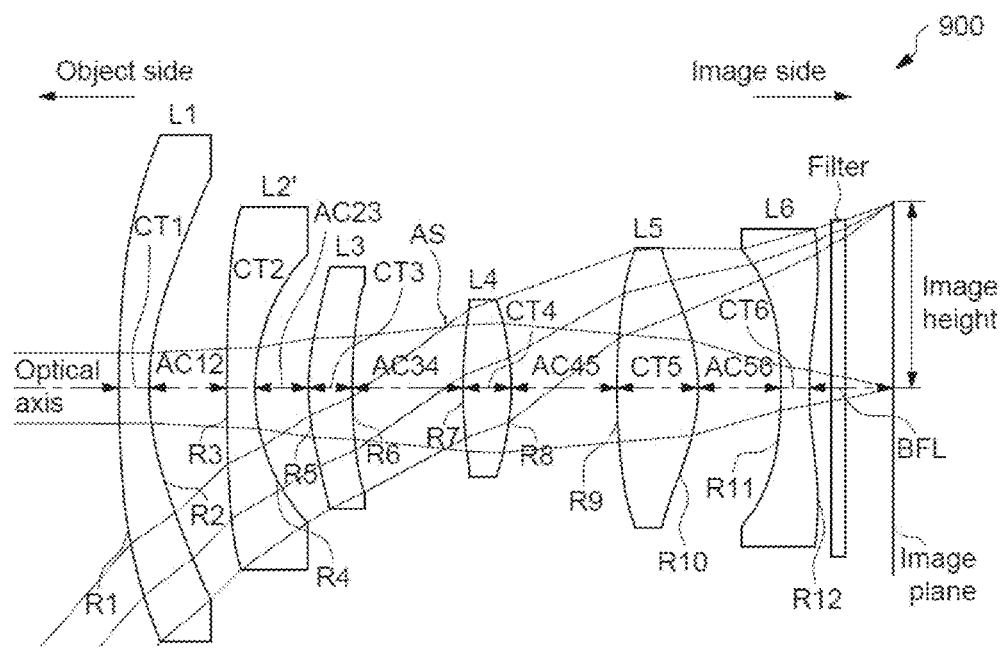
FIG. 10A is a simplified cross-section view of a six-element optical lens system according to a ninth embodiment of the present invention.

FIG. 10A is a simplified cross sectional view of a six-element optical lens system 900 according to a ninth embodiment of the present invention. Optical lens system 900 has a similar structure to optical lens system 100, except that the second lens element L2' has a convex object-side surface, which has a convex object-side surface in the vicinity of the optical axis and a convex object-side surface in the outer circumferential region.

Table 9A shows lens data of optical lens system 900 according to the ninth embodiment of the present invention.

TABLE 9A

| Embod. 9 | Curvature Radius (mm) | Thickness (mm) | Refractive index | Abbe # | material | Focal length (mm) |
|---|---|---|---|---|---|---|
| Lens 1 | 22.419 | 0.450 | 1.544 | 49.922 | plastic | −8.824 |
|  | 3.881 | 1.156 |  |  |  |  |
| Lens 2 | 32.708 | 0.417 | 1.544 | 49.922 | plastic | −6.085 |
|  | 2.955 | 0.798 |  |  |  |  |
| Lens 3 | 3.279 | 0.653 | 1.544 | 49.922 | plastic | 9.796 |
|  | 8.113 | 1.381 |  |  |  |  |
| Ape. Stop | Infinity | 0.272 |  |  |  |  |
| Lens 4 | 7.820 | 0.713 | 1.544 | 49.922 | plastic | 4.997 |
|  | −3.948 | 1.577 |  |  |  |  |
| Lens 5 | 10.599 | 1.208 | 1.544 | 49.922 | plastic | 4.011 |
|  | −2.592 | 1.234 |  |  |  |  |
| Lens 6 | −8.090 | 0.421 | 1.544 | 49.922 | plastic | −5.397 |
|  | 4.590 | 0.325 |  |  |  |  |
| filter | Infinity | 0.210 |  |  |  |  |
|  | Infinity | 0.722 |  |  |  |  |
| Image Plane | Infinity |  |  |  |  |  |

In the ninth embodiment, the effective focal length is 2.407 mm, and the half field of view (HFOV) is 48.966 degrees. The F number is 2.27. The image height is 2.754 mm. The BFL is 1.257 mm. The total length from the object-side surface of the first lens element to the image plane is 11.535 mm.

Table 9B numeric values of the conic constant K and aspheric surface coefficients for each of the aspheric lens surfaces of the ninth embodiment.

TABLE 9B

| Embod. 9 | R1 | R2 | R3 | R4 | R5 | R6 |
|---|---|---|---|---|---|---|
| K | 0.00000E+00 | 0.00000E+00 | 0.00000E+00 | 0.00000E+00 | 0.00000E+00 | 0.00000E+00 |
| a4 | 2.18544E−03 | −7.36247E−03 | −2.42944E−04 | −5.46588E−04 | −1.98944E−02 | 2.55786E−04 |
| a6 | −5.05107E−05 | 3.28318E−05 | 2.98319E−04 | 1.35750E−04 | −4.10578E−03 | −2.93778E−03 |
| a8 | 0.00000E+00 | 0.00000E+00 | 0.00000E+00 | 0.00000E+00 | 1.16666E−03 | 2.10753E−03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.000000+00 | 0.00000E+00 |
| a16 | 0.00000E+00 | 0.00000E+00 | 0.00000E+00 | 0.00000E+00 | 0.000000+00 | 0.00000E+00 |
|  | 0.00000E+00 | 0.00000E+00 | 0.00000E+00 | 0.00000E+00 | 0.000000+00 | 0.00000E+00 |

| Surface # | R7 | R8 | R9 | R10 | R11 | R12 |
|---|---|---|---|---|---|---|
| K | 0.00000E+00 | 0.00000E+00 | 0.00000E+00 | −2.74966E+00 | 0.00000E+00 | 0.00000E+00 |
| a4 | 5.92129E−04 | 3.96408E−03 | −7.91280E−04 | 3.75751E−03 | −1.97305E−02 | −3.37194E−02 |
| a6 | −4.29839E−03 | −4.46843E−03 | 1.65253E−03 | 8.31669E−04 | 4.58531E−04 | 3.93472E−03 |
| a8 | 3.25206E−03 | 2.04129E−03 | −2.26677E−04 | 0.00000E+00 | 0.00000E+00 | −2.10569E−04 |
| a10 | −4.05436E−04 | 0.00000E+00 | 2.06331E−05 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

Figures 10B, 10C, 10D:
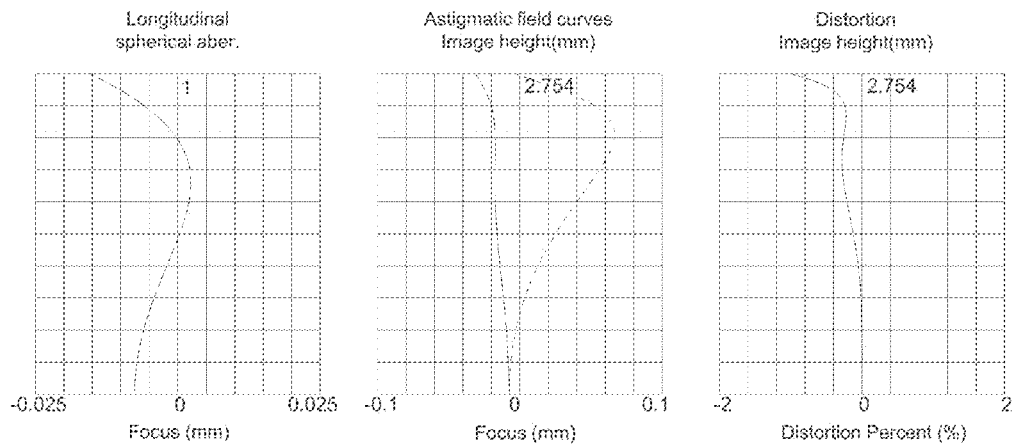
FIGS. 10B. 10C, and 10D are graphs illustrating the respective longitudinal aberration, sagittal and tangential curvatures, and distortion in the embodiment of FIG. 10A.

FIGS. 10B, 10C, and 10D are graphs illustrating the respective longitudinal aberration, sagittal and tangential field curvatures, and distortion for a wavelength of 940 nm in optical lens system 900 of FIG. 10A. The longitudinal aberration is less than ±0.02 percent, the sagittal and tangential aberration is less than ±0.08 mm, and the distortion is less than −2.0 percent.

In some embodiments, the aperture stop is disposed between the third and the fourth lens elements to obtain a wide field of view angle and improve the lens system performance. The optical lens system only has six lens elements that have a refractive power. The first lens element has a concave surface on the image-side in the vicinity of the optical axis. The second lens element has a negative refractive power. The third lens element has a convex surface on the object side in the vicinity of the optical axis. The fourth lens element has a convex surface on the object-side in the vicinity of the optical axis, and the fifth lens element has a convex surface on the image-side in the vicinity of the optical axis, the sixth lens element has a convex surface on the image-side around the outer circumference. The combination of these six lens elements provides the lens system quality. In addition, making the sixth lens element of plastic can reduce the weight of the lens system and simplify manufacturing. The combination of the second lens element having a concave surface in the vicinity of the optical axis and the fifth lens element having a positive refractive power and a convex surface in the vicinity of the optical axis provides an improved aberration correction. In some embodiments, all lens elements can be made of plastic, further reducing manufacturing costs and weight.

In embodiments described herein, the ratio of ALT/AC45 is equal to or less than 45.00. ALT is the total thickness of the first to the sixth lens elements along the optical axis. Reducing the total thickness will reduce the length of the lens system. Taking into account the ray path, the air gap between the fourth and fifth lens elements (AC45) should be sufficiently large for the light that passes through the relatively small diameter of the fourth lens element to the relatively large diameter of the fifth lens element, which places an upper limit on the air gap AC45. The total thickness can be reduced in a relatively larger amount, so that the ratio ALT/AC45 has an upper limit of 45.0. The ratio of ALT/AC45 can be in a range from 1.50 to 45.0, and preferably in the range between 2.0 and 45.0.

In embodiments described herein, the ratio of AC34/CT3 is equal to or greater than 0.55. Because the aperture stop is disposed between the third and fourth lens elements, the air gap between the third and fourth lens elements (AC34) thus has a lower limit, and the thickness of the third lens element (CT3) can be relatively reduced. Therefore, the ratio of AC34/CT3 can have a lower limit in a range of 0.55 to 7.50.

In embodiments described herein, the ratio of AC12/AC45 is less than or equal to 4.0. As mentioned above, the air gap between the fourth and fifth lens elements (AC45) should be relatively large, due to the fact that the diameter of the fourth lens element is smaller than the diameter of the fifth lens element, so that the light that passes through the fourth lens element will also completely passes through the fifth lens element. The air gap between the first and second lens (AC12) does not have such a limitation, and the air gap AC12 can be reduced. In some embodiments, the air gap ratio between AC12 and AC45 is set to between 0.5 and 4.0.

In embodiments described herein, the ratio of AC34/CT1 is equal to or greater than 0.8. As mentioned above, due to the presence of the aperture stop between the third and fourth lens elements, the reduction of the air gap between the third and fourth lens elements (AC34) is subjected to a lower limit. However, the thickness of the first lens element does not have this restriction, and the thickness of the first lens element can be reduced. In some embodiments, the ratio AC34/CT1 can be equal to or greater than 0.8, preferably between 0.8 and 5.5.

In embodiments described herein, the ratio of AAG/CT6 is equal to or greater than 3.7. Taking into consideration of the light path and image quality, the sum of the air gaps (AAG) has a certain minimum length. The thickness of the sixth lens element can be reduced. Thus, the ratio AAG/CT6 can have a lower limit. In some embodiments, the ratio AAG/CT6 is in the range between 3.7 and 27.0.

In embodiments described herein, the ratio AAG/AC12 is greater than or equal to 2.7. AAG has a certain minimum length to ensure good image quality and to keep the light path within the lens system. The air gap between the first and second lens elements has more design flexibility so that the ratio AAG/AC12 can have a lower limit. In some embodiments, the ratio AAG/AC12 is in the range between 2.70 and 6.50.

In embodiments described herein, the ratio BFL/AC45 is equal to or less than 3.5. BFL is the distance between the image surface of the sixth lens element and the image plane measured along the optical axis. A shorter BFL enables a shorter physical length of the lens system. However, the air gap AC45 has a lower limit due to the different diameters of the fourth and fifth lens elements. Thus, the ratio BFL/AC45 has an upper limit. In some embodiments, the ratio BFL/AC45 is in the range between 0.4 and 3.50.

In embodiments described herein, the ratio of EFL/CT4 is greater than or equal to 1.20. Taking into consideration of the light path and image quality, EFL has a certain minimum length. Because the fourth lens element has a relatively small diameter, its thickness CT4 can also be relatively small. Thus, the ratio BFL/CT4 has a lower limit. In some embodiments, the ratio EFL/CT4 is in the range between 1.2 and 3.5.

In embodiments described herein, the ratio of AAG/CT3 is greater than or equal to 3.5. As mentioned above, AAG has a certain minimum length to keep the light path within the lens system and ensure good image quality. The thickness of the third lens element is not so constrained, so the ratio AAG/CT3 can have a lower limit. In some embodiments, the ratio AAG/CT3 is in the range between 3.5 and 27.0.

In embodiments described herein, the ratio of EFL/CT2 is greater than or equal to 2.95. As mentioned above, EFL has a certain minimum length. The thickness of the second lens element can have more design freedom so that the ratio EFL/CT2 can have a lower limit. In some embodiments, the ratio EFL/CT2 is in the range between 2.95 and 6.50.

In embodiments described herein, the ratio of AAG/CT4 is greater than or equal to 4.20. As mentioned above, AAG has a certain minimum length to keep the light path within the lens system and ensure good image quality. The thickness of the fourth lens element is not so constrained, and the ratio AAG/CT4 can have a lower limit. In some embodiments, the ratio AAG/CT4 is in the range between 4.20 and 12.0.

In embodiments described herein, the ratio of AC34/CT2 is greater than or equal to 1.85. As mentioned above, due to the fact that the aperture stop is disposed between the third and fourth lens elements, the air gap AC34 has a certain minimum distance. However, because the second lens element has a negative refractive power, its thickness can be relatively small, and the ratio AC34/CT2 has a lower limit. In some embodiments, the ratio AC34/CT2 is in the range between 1.85 and 6.70.

In embodiments described herein, the ratio of EFL/CT3 is greater than or equal to 1.80. As mentioned above, EFL has a certain minimum length to ensure the light path and image quality. The thickness of the third lens element can be relatively small so that the ratio EFL/CT3 can have a lower limit. In some embodiments, the ratio EFL/CT3 is in the range between 1.80 and 7.50.

In embodiments described herein, the ratio of AC45/CT2 is greater than or equal to 1.80. The air gap between the fourth and fifth lens elements (AC45) has a certain minimum distance to ensure that all light passing through the fourth lens element will also pass through the fifth lens element. However, because the second lens element has a negative refractive power, its thickness can be relatively small so that the ratio AC45/CT2 has a lower limit. In some embodiments, the ratio AC45/CT2 is in the range between 1.80 and 4.00.

In embodiments described herein, the ratio AC56/CT1 is greater than or equal to 0.80. This helps to ensure good image quality and to keep the light. In some embodiments, the ratio AC56/CT1 is in the range between 0.80 and 5.00.

Table 10 summarizes data relating to the nine above-described embodiments.

TABLE 10

| Embodiment | 1st | 2nd | 3rd | 4th | 5th | 6th | 7th | 8th | 9th |
|---|---|---|---|---|---|---|---|---|---|
| ALT | 5.374 | 3.12 | 3.61 | 4.671 | 5.4 | 9.295 | 5.702 | 3.855 | 3.862 |
| AAG | 5.446 | 6.675 | 7.804 | 6.26 | 6.366 | 4.853 | 6.136 | 6.459 | 6.417 |
| TL | 10.82 | 9.795 | 11.414 | 10.931 | 11.766 | 14.148 | 11.837 | 10.315 | 10.279 |
| EFL | 1.957 | 1.733 | 2.132 | 1.892 | 2.16 | 2.266 | 1.858 | 2.305 | 2.278 |
| BFL | 0.897 | 0.754 | 0.748 | 0.804 | 0.695 | 0.686 | 0.808 | 1.219 | 1.257 |
| ALT/AC45 | 4.5 | 4.5 | 2.098 | 4.352 | 3.91 | 44.938 | 16.58 | 2.641 | 2.449 |
| AC34/CT3 | 1.099 | 5.943 | 7.015 | 4.779 | 0.574 | 1.628 | 2.581 | 2.726 | 2.529 |
| AC12/AC45 | 1.632 | 2.212 | 0.726 | 1.174 | 0.904 | 4 | 3.983 | 0.824 | 0.734 |
| AC34/CT1 | 2.971 | 3.764 | 5.257 | 2.583 | 1.548 | 0.988 | 1.942 | 3.635 | 3.672 |
| AAG/CT6 | 3.705 | 23.84 | 26.013 | 20.866 | 21.219 | 4.908 | 16.772 | 12.919 | 15.234 |
| AAG/AC12 | 2.794 | 4.352 | 6.249 | 4.965 | 5.101 | 5.865 | 4.48 | 5.369 | 5.549 |
| BFL/AC45 | 0.751 | 1.087 | 0.435 | 0.749 | 0.503 | 3.315 | 2.349 | 0.835 | 0.797 |
| EFL/CT4 | 3.302 | 2.94 | 2.889 | 1.328 | 2.676 | 2.609 | 2.416 | 3.326 | 3.197 |
| AAG/CT3 | 5.036 | 21.918 | 26.013 | 20.866 | 3.536 | 4.625 | 9.272 | 10.766 | 9.822 |
| EFL/CT2 | 3.108 | 6.189 | 4.468 | 4.03 | 4.771 | 4.475 | 3.994 | 5.499 | 5.466 |

TABLE 10-continued

| Embodiment | 1st | 2nd | 3rd | 4th | 5th | 6th | 7th | 8th | 9th |
|---|---|---|---|---|---|---|---|---|---|
| AAG/CT4 | 9.19 | 11.324 | 10.575 | 4.395 | 7.887 | 5.587 | 7.978 | 9.322 | 9.006 |
| AC34/CT2 | 1.888 | 6.465 | 4.41 | 3.054 | 2.283 | 3.374 | 3.672 | 3.902 | 3.965 |
| EFL/CT3 | 1.81 | 5.69 | 7.107 | 6.307 | 1.2 | 2.159 | 2.808 | 3.842 | 3.487 |
| AC45/CT2 | 1.897 | 2.476 | 3.605 | 2.287 | 3.051 | 0.408 | 0.739 | 3.483 | 3.783 |
| AC56/CT1 | 1.101 | 3.34 | 4.854 | 2.707 | 2.778 | 0.821 | 2.026 | 3.135 | 2.742 |

Figure 11:
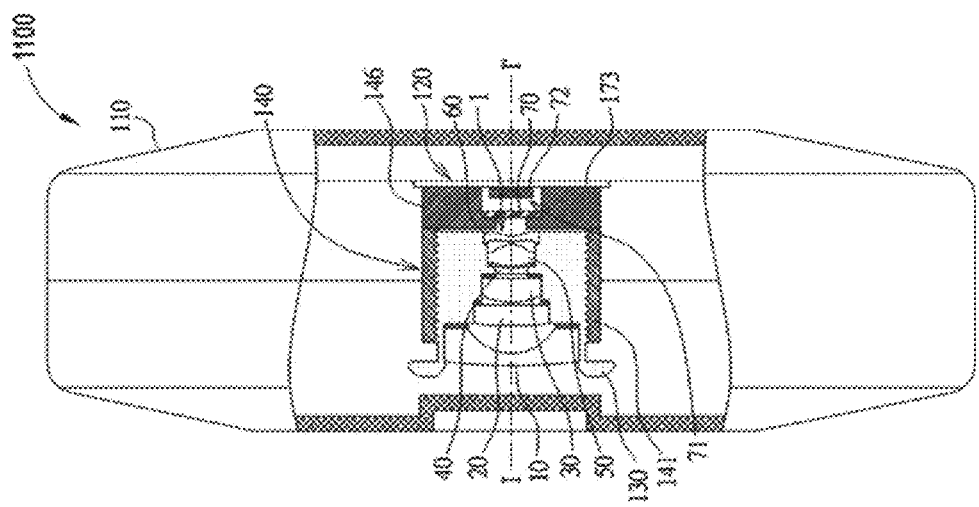
FIG. 11 is a simplified cross-sectional view of a portable electronic device with a built-in optical imaging module according to an embodiment of the present invention.

Certain embodiments of the present invention relate to a electronic device with a built-in optical imaging module that is compact and lightweight. FIG. 11 shows a electronic device 1100 having a built-in optical imaging module according to an embodiment of the present invention. The electronic device 1100 includes a housing 110 and an optical imaging module 120 mounted in the housing. The electronic device 1100 may be a mobile phone, a personal digital assistant (PDA), or the like. Optical imaging module 120 includes an optical lens system 1, a lens barrel unit 130, a module housing unit 140 for mounting the lens barrel unit, a substrate 173 for securing module housing unit 140, and an imaging sensor 72 disposed on a surface of substrate 173 facing optical lens system 1. Imaging sensor 72 may be an electronic image sensor, such as a photosensitive member or a complementary metal oxide semiconductor element. Imaging sensor 72 includes an imaging surface 71. In an embodiment, optical lens system 1 may include a six-element optical lens system such as any of the nine embodiments described above.

In some embodiments, imaging sensor 72 can be directly connected with substrate 173 using chip-on-board (COB) techniques. While not required, COB has certain advantages over the conventional chip scale package (CSP), in that COB does not require a cover glass for protecting imaging sensor 72.

It will be appreciated that, although an optical filter 70 is shown in the embodiments described, the optical filter may be omitted if desired. Housing 110, lens barrel unit 130, and/or module housing unit 140 can be assembled in a single component or in multiple components.

In one embodiment, optical lens system 1 comprises six lens elements 10, 20, 30, 40, 50, and 60 disposed in lens barrel unit 130 and having air gaps therebetween. Lens barrel unit 130 can be shaped to hold lens elements 10, 20, 30, 40, 50, 60 in position and maintain the air gaps. Module housing unit 140 includes a lens body 141 to hold the lens barrel unit and a rear base 146 disposed between lens body 141 and imaging sensor 72. In some embodiments, rear base 146 can be omitted. Lens barrel unit 130 and lens body 141 are arranged concentrically with the optical axis I-I', and lens barrel unit 130 is disposed on the inner circumferential side of the lens body 141.

Because the total length of the optical lens module 1 is about 13.0 mm, in this embodiment, portable device 1100 can be made to be compact and lightweight while providing good optical characteristics and performance. Thus, in addition to reducing the amount of assembly materials, some embodiments can also provide a compact and lightweight design to satisfy consumer demand.

Figure 12:
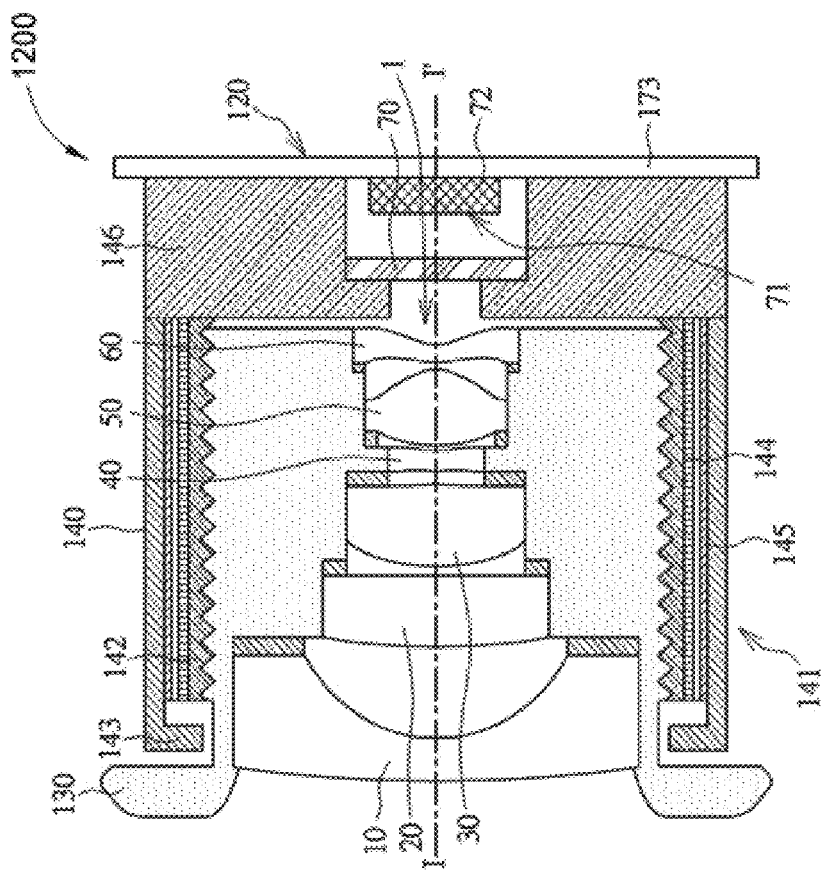
FIG. 12 is a simplified cross-sectional view of a portable electronic device with a built-in optical imaging module according to another embodiment of the present invention.

In some embodiments, the optical lens assembly can be movable relative to an imaging sensor, allowing for variable focus. For example, FIG. 12 shows an optical imaging module 1200 is similar to optical imaging module 120 so that the same reference numerals are used to identify corresponding components. In optical imaging module 1200, lens body 141 includes a first body unit 142, a second body unit 143, a coil 144, and a magnetic component 145. First body unit 142 and an outer circumference side of lens barrel unit 130 are disposed adjacent (and interlocked with) each other and concentric along the optical axis I-I'. Second body unit 143 has a first terminal facing the object side and a second terminal facing the image side and is disposed along the optical axis I-I' surrounding the outer circumferential surface of first body 142. Coil 145 is disposed between the outer circumferential surface of first body unit 144 and inner circumferential surface of second body unit 143. Magnetic component 145 is disposed between the outer surface of coil 144 and the inner surface of second body unit 143.

First body unit 142 moves lens barrel unit 130 including optical lens system 1 mounted in lens barrel unit 130 back and forth in the direction of the optical axis. For example, electrical currents in coil 144 can create a magnetic field that creates a force on magnetic component 145, resulting in movement of lens barrel 130. Rear base 146 and second body unit 143 are connected to each other. Filter 70 (which is optional) can pass wavelengths over 700 nm and is mounted on the rear base 146.

The present invention is not limited to the above-described embodiments. The invention is intended to cover all modifications and equivalents within the scope of the appended claims.

What is claimed is:

1. An optical imaging system comprising, in order from an object side to an image side, a first lens element, a second lens element, a third lens element, an aperture stop, a fourth lens element, a fifth lens element, and a sixth lens element arranged along an optical axis; wherein:
   the first lens element has a concave image-side surface in the vicinity of the optical axis;
   the second lens element has a negative refractive power;
   the third lens element has a convex object-side surface in a vicinity of the optical axis;
   the fourth lens element has a convex object-side surface in the vicinity of the optical axis;
   the fifth lens element has a convex image-side surface in the vicinity of the optical axis;
   the sixth lens element is made of plastic and has a convex image-side surface in a vicinity of an outer circumference; and
   the optical imaging system only has six lens elements having a refractive power.

2. The optical imaging system of claim 1, wherein a sum of thicknesses of the first, second, third, fourth, fifth, and sixth lens elements along the optical axis is defined as ALT and an air gap along the optical axis between the fourth and fifth lens elements is defined as AC45, and wherein ALT and AC45 satisfy the relation:

$ALT/AC45 \leq 45.0$.

3. The optical imaging system of claim 2, wherein an air gap along the optical axis between the third and fourth lens elements is defined as AC34 and a thickness along the optical axis of the third lens element is defined as CT3, and wherein AC34 and CT3 satisfy the relation:

$0.55 \leq AC34/CT3$.

4. The optical imaging system of claim 3, wherein an air gap along the optical axis between the first and second lens elements is defined as AC12, and wherein AC12 and AC45 satisfy the relation:

$AC12/AC45 \leq 4.0$.

5. The optical imaging system of claim 4, wherein a thickness along the optical axis of the first lens element is defined as CT1, and wherein AC34 and CT1 satisfy the relation:

$0.80 \leq AC34/CT1$.

6. The optical imaging system of claim 5, wherein a sum of air gaps between the first lens element through the sixth lens element along the optical axis is defined as AAG and a thickness along the optical axis of the sixth lens element is defined as CT6, and wherein AAG and CT6 satisfy the relation:

$3.70 \leq AAG/CT6$.

7. The optical imaging system of claim 2, wherein an air gap between the first and second lens elements is defined as AC12, and wherein AC12 and AAG satisfy the relation:

$2.70 \leq AAG/AC12$.

8. The imaging optical system of claim 7, wherein a back focal length from the image side surface of the sixth lens element to an image plane is defined as BFL, and wherein BFL and AC45 satisfy the relation:

$BFL/AC45 \leq 3.50$.

9. The optical imaging system of claim 8, wherein an effective focal length is defined as EFL and a thickness of the fourth lens element along the optical axis is CT4, and wherein EFL and CT4 satisfy the relation:

$1.20 \leq EFL/CT4$.

10. The optical imaging system of claim 1, wherein an air gap between the third and fourth lens elements along the optical axis is defined as AC34 and a thickness of the third lens element is defined as CT3, and wherein AC34 and CT3 satisfy the relation:

$0.55 \leq AC34/CT3$.

11. The optical imaging system of claim 10, wherein a sum of air gaps between the first lens element through the sixth lens element along the optical axis is defined as AAG and a thickness of the third lens element is defined as CT3, and wherein AAG and CT3 satisfy the relation, and they satisfy the relation:

$3.50 \leq AAG/CT3$.

12. The optical imaging system of claim 11, wherein an effective focal length is defined as EFL and a thickness of the second lens element is defined as CT2, and wherein EFL and CT2 satisfy the relation:

$2.95 \leq EFL/CT2$.

13. The optical imaging system of claim 12, wherein a thickness of the fourth lens element along the optical axis is defined as CT4, and wherein AAG and CT4 satisfy the relation:

$4.20 \leq AAG/CT4$.

14. The optical imaging system of claim 10, wherein a thickness of the second lens element is defined as CT2, and wherein AC34 and CT2 satisfy the relation:

$1.85 \leq AC34/CT2$.

15. The optical imaging system of claim 14, wherein an effective focal length is defined as EFL and a thickness of the third lens element along the optical axis is defined as CT3, and wherein EFL and CT3 satisfy the relation:

$1.80 \leq EFL/CT3$.

16. The optical imaging system of claim 1, wherein a sum of air gaps between the first lens element through the sixth lens element along the optical axis is defined as AAG and an air gap between the first and second lens elements is defined as AC12, and wherein AAG and AC12 satisfy the relation:

$2.70 \leq AAG/AC12$.

17. The optical imaging system of claim 16, wherein an air gap between the fourth and fifth lens elements along the optical axis is defined as AC45 and a thickness of the second lens element is defined as CT2, and wherein AC45 and CT2 satisfy the relation:

$1.80 \leq AC45/CT2$.

18. The optical imaging system of claim 1, wherein an air gap between the fifth and sixth lens elements along the optical axis is defined as AC56 and a thickness of the first lens element along the optical axis is defined as CT1, and wherein AC56 and CT1 satisfy the relation:

$0.80 \leq AC56/CT1$.

19. The optical imaging system of claim 18, wherein the first through sixth lens elements are made of plastic.

20. A portable electronic device comprising:
a housing;
a lens barrel mounted in the housing;
an optical imaging system assembled in the lens barrel;
a lens barrel having a module housing unit; and
an imaging sensor disposed on an image side of the imaging optical system;
wherein the optical imaging system comprises, in order from an object side to an image side, a first lens element, a second lens element, a third lens element, an aperture stop, a fourth lens element, a fifth lens element, and a sixth lens element arranged along an optical axis;
wherein:
the first lens element has a concave image-side surface in the vicinity of the optical axis;
the second lens element has a negative refractive power;
the third lens element has a convex object-side surface in a vicinity of the optical axis;
the fourth lens element has a convex object-side surface in the vicinity of the optical axis;
the fifth lens element has a convex image-side surface in the vicinity of the optical axis;
the sixth lens element is made of plastic and has a convex image-side surface in a vicinity of an outer circumference; and
the optical imaging system only has six lens elements having a refractive power.

* * * * *